United States Patent

Ohmi et al.

[11] Patent Number: 5,814,984
[45] Date of Patent: Sep. 29, 1998

[54] ROLLER BEARING UNIT HAVING AN IMPROVED STRUCTURE FOR RETAINING AND SEALING A COVER THEREON

[75] Inventors: Hayato Ohmi; Hideo Ouchi, both of Kanagawa, Japan

[73] Assignee: NSK Ltd., Tokyo, Japan

[21] Appl. No.: 697,347

[22] Filed: Aug. 22, 1996

[30] Foreign Application Priority Data

| Aug. 22, 1995 | [JP] | Japan | 7-213478 |
| Dec. 20, 1995 | [JP] | Japan | 7-332133 |
| Jun. 7, 1996 | [JP] | Japan | 8-146047 |
| Jul. 5, 1996 | [JP] | Japan | 8-176553 |

[51] Int. Cl.$^6$ .............. G01P 3/44; G01P 3/488
[52] U.S. Cl. ............ 324/173; 324/174; 384/448
[58] Field of Search ............ 324/173, 174, 324/207.25; 384/448; 73/493, 494, 514.39

[56] References Cited

U.S. PATENT DOCUMENTS

| 4,988,220 | 1/1991 | Christiansen et al. | 384/448 |
| 5,010,290 | 4/1991 | Foster | 324/173 |
| 5,148,104 | 9/1992 | Ishikawa | 324/173 |
| 5,172,984 | 12/1992 | Lederman | 384/489 |
| 5,195,807 | 3/1993 | Lederman | 301/108.1 |
| 5,296,805 | 3/1994 | Clark et al. | 324/174 |
| 5,550,467 | 8/1996 | Goossens | 324/173 |
| 5,602,335 | 2/1997 | Ouchi | 324/174 X |
| 5,622,436 | 4/1997 | Morita et al. | 384/448 |
| 5,663,640 | 9/1997 | Sakamoto | 324/173 |

FOREIGN PATENT DOCUMENTS

| A2 0401464 | 12/1990 | European Pat. Off. | G01P 3/44 |
| A1 0557931 | 9/1993 | European Pat. Off. | G01P 3/44 |
| 1-156464 | 10/1989 | Japan | G01P 3/488 |
| 2-290701 | 11/1990 | Japan | B60B 35/04 |
| 4-110602 | 9/1992 | Japan | B60B 27/00 |
| 5-14634 | 2/1993 | Japan | F16C 19/52 |
| 5-27335 | 4/1993 | Japan | F16C 19/52 |

*Primary Examiner*—Gerard R. Strecker
*Attorney, Agent, or Firm*—Sughrue, Mion, Zinn, Macpeak & Seas, PLLC

[57] ABSTRACT

A rolling bearing unit having a rotating speed detector includes an outer race, an inner race, a cover made of synthetic resin, a sleeve made cylindrically of metal, and a seal ring fitted between the cover and the outer race, in which a first leaking passage exists between a first clearance formed on an engaging surface between the sleeve and the outer race and a third clearance formed between the outer race and the cover, the first and the third clearances being arranged in series to each other, and a second leaking passage exists between the third clearance and a second clearance formed in a contact portion of the sleeve with the cover, the third and the second clearances being arranged in series to each other. The single seal ring is capable of preventing the entrance of muddy water into the cover and the outer race through the first and the second clearance.

4 Claims, 20 Drawing Sheets

ROLLER BEARING UNIT HAVING AN IMPROVED STRUCTURE FOR RETAINING AND SEALING A COVER THEREON

BACKGROUND OF THE INVENTION

The present invention relates to a rolling bearing unit having a rotating speed detector for rotatably supporting a wheel of an automobile by a suspension, and the rolling bearing unit having a rotating speed detector is used for detecting a rotating speed of the wheel.

A rolling bearing unit having a rotating speed detector is used for rotatably supporting a wheel of an automobile by a suspension and also used for controlling an anti-lock brake system (ABS) or a traction control system (TCS) by detecting a rotating speed of the wheel with the detector. Conventionally, various types of rolling bearing units having rotating speed detectors are well known. Each rotating speed detector incorporated into the rolling bearing unit includes a tone wheel, which is an element to be detected, rotated in conjunction with a wheel, and a sensor to output an output signal, the frequency of which changes in proportion to a rotating speed of the tone wheel. For example, a rolling bearing unit having a rotating speed detector shown in FIGS. 19 and 20 in described in the Technical Report No. 94-16051 by HATSUMEI KYOKAI, which is referred to an the first conventional example, hereinafter.

A hub 1 Includes an inner race assembly. A flange 2 for fixing a wheel is formed on an outer circumferential surface of the outside and portion of the hub 1. The outside in defined as a side located outside of a vehicle with respect to the width direction of the vehicle when the rolling bearing is assembled into the vehicle. An inner raceway 3a and a step portion 4 are formed on an outer circumferential surface of the middle portion of the hub 1. Further, an inner raceway 3b is formed on an outer circumferential surface of the hub 1. In this way, an inner race 5 composing the inner race assembly in conjunction with the hub 1 in supported while an outer end surface of the inner race 5 is pushed against the step portion 4. In this connection, instead of directly forming the inner raceway 3a on the outer circumferential surface of the hub 1, another inner race (not shown) different from the hub 1 may be provided, and the inner race and the above inner race 5 may be outwardly engaged with the hub 1 so as to be fixed.

A male screw portion 6 in formed in a portion close to the inside and of the hub 1. The inside is defined as a side located inside of a vehicle with respect to the width direction of the vehicle when the rolling bearing in assembled into the vehicle. When a nut 7 in fastened to the male screw 6, the inner race 5 is fixed in a predetermined portion on the outer circumferential surface of the hub 1, so that the inner race assembly can be composed. An attaching portion 9 for fixing the outer race 8 to the suspension is formed on an outer circumferential surface of an outer race 8 arranged around the hub 1. Outer raceways 10a, 10b are formed on an inner circumferential surface of the outer race 8. The outer raceways. 10a, 10b are respectively opposed to the inner raceways 3a, 3b. A plurality of rolling elements 11, 11 are installed between the inner raceways 3a, 3b and the outer raceways 10a, 10b. Due to the above arrangement, the hub 1 is capable of rotating inside the outer race 8. In this connection, in the example shown in FIGS. 19 and 20, balls are used for the rolling elements. However, in the case of a rolling bearing unit used for an automobile to which a heavy load is given, tapered rollers are used as the rolling elements in some cases. A seal ring 12 is fitted between the inner circumferential surface of the outside end portion of the outer race 8 and the outer circumferential surface of the hub 1. Since the seal ring 12 is arranged between the inner circumferential surface of the outer ring 8 and the outer circumferential surface of the hub 1, an outside end opening of the space in which the plurality of rolling elements are arranged is closed by the seal ring 12.

A base and portion of the tone wheel 13, that is, a left and portion of the tone wheel 13 shown in FIGS. 19, 20 is engaged with and fixed to an inside end portion of the inner race 5 which is a little distant from the inner raceway 3b. The entire tone wheel 13 is formed from a magnetic metal sheet such as a steel sheet into an annular shape (a short cylindrical shape). The tone wheel 13 is composed of a small diameter portion 14 and a large diameter portion 15 which are continuously connected to each other by a stop portion 16, in which the small diameter portion 14 and the large diameter portion 15 are formed concentrically. The large diameter portion 15 of the tone wheel 13 is outwardly engaged with the outer circumferential surface of the end portion of the inner race 5, and the step portion 16 comes into contact with an end edge of the inner race 5. Under the above condition, the tone wheel 13 is supported by and fixed to the inner race 5. Therefore, the small diameter portion 14 is supported concentrically with the inner race 5. A plurality of through-holes 17 are formed in the small diameter portion 14 of the tone wheel 13 to serve as cutout portions on the rotational side. These through-holes 17 are formed in the circumferential direction at regular intervals. Accordingly, the magnetic characteristic of the tone wheel 13 in alternately changed in the circumferential direction at regular intervals. Shapes of the through-holes 17 are the same. Each though-hole 17 is formed into a rectangle, the long side of which in disposed in the axial directions that is, the transverse direction in FIGS. 19 and 20.

An inside and opening of the outer race 8 is closed by a cover 18 formed into a cylindrical shape having a bottom from a metal sheet such as a stainless steel sheet or an aluminum alloy sheet by means of drawing. An annular synthetic resin member 21 which embeds an annular sensor 20 in fitted on an inner circumferential side of the cylindrical portion 19 composing the cover 18. The annular sensor 20 includes a permanent magnet 22; a stator 23 composed of a magnetic member such as a steel sheet; and a coil 24. When these member 22, 23, 24 are embedded in the above synthetic resin 21, they are entirely formed into an annular shape.

In the above components of the sensor 20, the permanent magnet 22 is formed into an annular shape (ring shape) and magnetized in the diametrical direction. An inner circumferential surface of the permanent magnet 22 in opposed to a base end portion of the small diameter portion 14 of the tone wheel 13 while a minute clearance 25 is maintained between them. An outer circumferential surface of the portion of the tone wheel 13 in which the through-hole 17 is not formed is opposed to a base and portion of the small diameter portion 14 of the tone wheel 13 while a minute clearance in maintained between them. The stator 23 is entirely formed into an annular shape, the section of which is a substantial J-shape. An inner circumferential surface of the end portion of the outer diameter side cylindrical portion 26 composing the stator 23 is arranged close to or contacted with an outer circumferential surface of the permanent magnet 22. An inner circumferential surface of the inner diameter side cylindrical portion 27 composing the stator 23 is opposed to a portion of the tone wheel 13 in which the plurality of through-holes are formed. In the inner diameter side cylindrical portion 27, a plurality of cutout portions 28, which are stationary side cutout portions, are formed at regular intervals (central angle pitch), which are the same as those of the through-holes 17, in the circumferential direction of the inner diameter side cylindrical portion 27. Accordingly, the inner diameter side cylindrical portion 27 is formed into a comb-shape.

The coil 24 is formed into an annular shape in such a manner that a wire is wound around a bobbin made of nonmagnetic material. The coil 24 is arranged in a portion on the inner circumferential side 26 of the outer diameter side cylindrical portion 26 composing the stator 23. An electromotive force generated in the coil 24 is taken out from a connector 30, which is a signal taking means, protruding from an outer surface of the cover 18.

In the rolling bearing unit having a rotating speed detector composed in the above manner when the tone wheel 13 is rotated together with the hub 1, the magnetic flux density in the stator 23 opposed to the tone wheel 13 is changed, and the voltage generated in the coil 24 in changed at the frequency proportional to the rotating speed of the hub 1. The principle in which the voltage generated in the coil 24 is changed in accordance with a change in the magnetic flux flowing in the stator 23 in the same as the principle of the conventionally well known sensor used for detecting a rotating speed. The reason why the density of magnetic flux flowing in the stator 23 is changed in accordance with the rotation of the tone wheel 13 is described as follows.

Intervals of the plurality of through-holes 17 provided in the tone wheal 13 are the same as those of the cutout portions 28 provided in the stator 23. Accordingly, when the tone wheel 13 is rotated, each through-hole 17 is opposed to each cutout portion 28 all over the circumference at one moment. At this moment when each through-hole 17 in opposed to each cutout portion 28, a pillar portion, which is a magnetic body, provided between the through-holes 17 adjacent to each other is opposed to a tongue member, which in a magnetic body, provided between the cutout portions 28 adjacent to each other. Under the condition that each pillar portion, which is a magnetic body, is opposed to each tongue member, which in also a magnetic body, a magnetic flux of high density flows between the tone wheel 13 and the stator 23.

On the other hand, when the phase of the through-hole 17 deviates from the phase of the cutout portion 28 by half the interval, the density of magnetic flux flowing between the tone wheel 13 and the stator 23 is lowered. In the above condition, the through-hole 17 provided in the tone wheel 13 is opposed to the tongue member, and at the same time the cutout portion 28 provided in the stator 23 is opposed to the pillar portion. A relatively large space between the tone wheel 13 and the stator 23 is formed all over the circumference under the above condition in which the pillar portion is opposed to the cutout portion 28 and the tongue member is opposed to the through-hole 17. Under this condition, the density of magnetic flux flowing between both members 13 and 23 is lowered. As a result, a voltage generated in the coil 24 in changed in proportion to the rotating speed of the hub 1. Due to the above action, the sensor 20 changes an output voltage generated in the coil 24 at the frequency proportional to the rotating speed of the hub 1.

However, in the rolling bearing unit having a rotating speed detector according to the first conventional example, the following problem may be encountered. In the first conventional example shown in FIGS. 19 and 20, the synthetic resin 21 in which the sensor 20 is embedded and the synthetic resin composing the connector 30 are disposed on both side of the cover 18 made of a metallic sheet. Accordingly, the manufacturing work is complicated, and the cost in raised. That is, the rolling bearing unit having a rotating speed detector shown in FIGS. 19, 20 is manufactured as follows. First, the sensor 20 in embedded in the synthetic resin 21, and then the synthetic resin 21 in provided inside the cover 18. After that, under the condition that the cover 18 is set in the mold, injection molding in conducted to form the connector 30. Therefore, it is necessary to conduct the injection molding process twice. Alternatively, it is necessary to provide an adhesion process in which the synthetic resin 21 and the connector 30, which have been made by mans of injection molding, are made to adhere to each other. As a result, the manufacturing cost is raised.

FIG. 21 is a view showing a rolling bearing unit having a rotating speed detector according to the second conventional example disclosed in Unexamined Japanese Patent Publication no. 63-166601.

The rotating wheal is composed of a hub 1 and an inner race 2. A flange 3 for fixing a wheel is formed in the outside end portion of the hub 1. An inner raceway 4a is formed in an outer circumferential surface of the middle portion of the hub 1. An inner raceway 4b in formed on an outer circumferential surface of the inner race 2. The inner race 2 is outwardly engaged with an outer circumferential surface of the middle portion of the hub 1. A male screw portion 5 in formed on an outer circumferential surface of the inside end portion of the hub 1. The male screw portion 5 is screwed to a nut 6. When the nut 6 is screwed to the male screw portion 5, an inside end surface of the inner race 2 is pushed, so that the inner race 2 can be fixed at a predetermined position on the outer circumferential surface of the hub 1.

A flange-shaped attaching portion 8 for supporting a suspension (not shown) in formed on an outer circumferential surface of the outer race 7 which is a stationary wheel. Two rows of outer raceways 9a, 9b are formed on an inner circumferential surface of the outer race 7. A plurality of rolling elements 10, 10 are formed between the outer raceways 9a, 9b and the inner raceways 4a, 4b. In thin arrangement, the hub 1 is rotatably supported inside the outer race 7 supported by the suspension via the attaching portion 8.

The nut 6 includes a disk-shaped rotor 11. An irregular portion 12 in formed on the inside surface of the rotor 11. By the action of the irregular portion 12, the nut 6 generates a pulse-like output in a sensor 14 described later in accordance with the rotation of the hub 1. That is, the nut 6 functions as a tone wheel. A cover 13 is engaged with the inside opening of the outer race 7. The sensor is fixed to the cover 13, and an outside and surface of the sensor 14 is opposed to the irregular portion 12.

In the rolling bearing unit having a rotating speed detector described above, a wheel fixed to the flange portion 3 arranged in the outside and portion of the hub 1 can be rotatably supported by the suspension which holds the outer race 7. When the rotor 11 integrated with the nut 6 screwed to the inside end portion of the hub 1 is rotated in accordance with the rotation of the wheel, an output of the sensor 14 opposed to the irregular portion on the inside surface of the rotor 11 is changed. The frequency of a change in the output of the sensor 14 is proportional to the rotating speed of the wheel. Accordingly, when the output signal of the sensor 14 is inputted into a controller not shown in the drawing, it is possible to find the rotating speed of the wheel. Therefore, ABS and TCS can be appropriately controlled.

In the conventional rolling bearing unit having a rotating speed detector composed as described above, an outside opening of the cover 13 which holds the sensor 14 with respect to the outer race 7 is tightly fitted into the inside opening of the outer race 7 in order to prevent the cover 13 from being carelessly disconnected from the outer race 7 by the vibration caused when the automobile is running.

However when the cover 13 is tightly fitted into the outer race 7 as described above, it becomes difficult to separate both members 7, 13 from each other. When both members 7, 13 are forcibly separated from each other with a tool such as a driver, a strong force is given to the cover 13, and the cover 13 is deformed. As a result, it is impossible to use the cover 13 again. For this reason, when either the rolling bearing portion or the sensor 14 is out of order after the rolling bearing unit has been incorporated into an automobile and used over a long period of time, the entire rolling bearing unit having a rotating speed detector must be also replaced, that is, a portion which is in good order must be replaced. This causes a raise in the maintenance cost. From the viewpoint of economizing resources, such a case is not preferable.

In view of the above circumstances, in order to detach the cover 13 from the outer race 7 easily, Unexamined Japanese Utility Model Publication No. 5-514634 discloses a rolling bearing unit having a rotating speed detector an shown in FIG. 22, which is referred to the third conventional example. In the rolling bearing unit having a rotating speed detector, a flange portion 3 for fixing a wheel in formed on an outer circumferential surface of the outside end portion of the hub 1 composing a rotating wheel in conjunction with the inner race 2. An inner raceway 4a and a step portion 15 are formed on an outer circumferential surface of the middle portion of the hub 1. In the inner race 2 having the inner raceway 4b which is formed on the outer circumferential surface of the hub 1, an outside end surface of the inner race 2 is confronted with the step portion 15 so that the inner race 2 in outwardly supported to the outer circumferential surface of the hub 1.

A male screw portion 5 is formed on an outer circumferential surface of the inside end portion of the hub 1. When a nut 6 is fastened to the male screw portion 6, the inner race 2 is fixed in a predetermined portion on the outer circumferential surface of the hub 1. An irregular portion 16 is formed on an outer circumferential surface of the nut 6. Therefore, the nut 6 functions as a tone wheel for detecting a rotating speed of the nut 6. An attaching portion 8 for fixing the outer race 7 to the suspension in formed on an outer circumferential surface of the outer race 7. A pair of outer raceways 9a, 9b are formed on an inner circumferential surface of the outer race 7 and are respectively opposed to the inner raceways 4a, 4b. A plurality of rolling elements 10, 10 are installed between a pair of inner raceways 4a, 4b and a pair of outer raceways 9a, 9b so that the hub 1 can be freely rotated inside the outer race 7. A seal ring 17 is fitted between the inner circumferential surface on the outside end portion of the outer race 7 and an outer circumferential surface of the hub 1. Further, a seal ring 17 is fitted between the inner circumferential surface on the inside and portion of the outer race 7 and an outer circumferential surface of the inner race 2. That is, the seal ring 17 exists between the inner circumferential surface of the outer race 7 and the outer circumferential surface of the hub 1, and also, the seal ring 17 exists between the inner circumferential surface of the outer race 7 and the outer circumferential surface of the inner race 2. The seal rings 17 close openings on both side end portions of the space in which the plurality of rolling elements are accommodated.

A portion of the opening of the inside end portion (the right end portion in FIG. 22) of the outer race 7 is closed by a cover 18. The entire cover 18 is formed into an annular shape by press-forming a metallic sheet. The shape of the cover 18 is described as follows. In order to insert a portion of a constant velocity joint inside the cover 18 in the diametric direction, an outer periphery of the base plate portion 19 formed into an annular shape is bent at a right angle to the outside (to the left in FIG. 22), so that a cylindrical vertical wall 20 can be formed. Further, an annular step portion 21 is formed on an outer circumferential periphery of the opening of the outside end (the left end in FIG. 22) of the vertical wall 20 so that the annular step portion 21 is capable of being freely confronted with the inside end surface 7a of the outer race 7.

When an outer circumferential edge of the step portion 21 in bent outwardly at a right angle, an engaging cylindrical portion 22 capable of engaging with the inside end portion of the outer race 7 is formed. When an outside end opening of the engaging cylindrical portion 22 in bent outwardly in the diametric direction by an angle of 180j, an engaging portion 23, the size in the diametric direction of which in large, is formed. The cover 18 is fixed to the outer race 7 in such a manner that the engaging cylindrical portion 22 is outwardly engaged with the inside and portion of the outer race 7, and at the same time the step portion 21 is confronted with the inside end surface 7a of the outer race 7. The engaging strength of the engaging cylindrical portion 22 and the inside end portion of the outer race 7 is determined to be a sufficiently high value so that the outer race 7 and the cover 18 can not be disconnected from each other by the vibration caused when the automobile in running. For example, an electromagnetic sensor 14 is fitted inside the cover 18 and an output of the sensor 14 is sent to a controller (not shown) via a lead wire 24.

Substantially in the same manner as that of the rolling bearing unit having a rotating speed detector shown in FIG. 21, by the above rolling bearing unit having a rotating speed detector, the wheel is rotatably held with respect to the suspension, and the rotating speed of the wheel fixed to the flange portion 3 of the hub 1 can be detected. Especially, when it becomes necessary to disconnect the cover 18 from the outer race 7 for the purpose of maintenance in the arrangement shown in FIG. 22, an shown by a chain line in FIG. 22, an inner circumferential edge of a tool 25 such as a hand press or a pulley extractor having an engaging portion of split structure is engaged with an end edge of the engaging portion 23 formed in the outer circumferential edge of the outside end opening of the cover 18. When the tool 25 is displaced in a direction in which the tool 25 is separated from the attaching portion 8, that is, when the tool 25 is displaced to the right in FIG. 22, the cover 18 is separated from the outer race 7, so that the cover 18 is disconnected from the outer race 7.

In the conventional structure shown in FIG. 22, the cover 18 is formed from a metallic sheet by Means of plastic working. On the other hand, when the cover is made of synthetic resin and the sensor is embedded in a portion of the cover in the process of injection molding, it is possible to reduce the manufacturing cost of the rolling bearing unit having a rotating speed detector. This structure is conventionally known, in which the sensor is embedded in a portion of the cover made of synthetic resin. For example, European Patent Publication No. EP0557931-A1 discloses the above arrangement. This arrangement shown in FIG. 23, which is defined as the fourth conventional example, is described as follows. A sensor 20a is embedded in the cover 18a made of synthetic resin which closes an inside and opening of the outer race 8. Onto an outer circumferential surface of the opening end portion of the cover 18a, a sleeve 31 is fixed, which is formed from a metallic sheet such as a steel sheet having a sufficiently high rigidity, and the section of the sleeve 31 is an L-shape and the entire shape of the sleeve 31 in formed into an annular shape.

When the sleeve 31 is met in a cavity of the mold in the process of injection molding of the cover 18a, it can be embedded in the above synthetic resin. The above cover 18a is fixed to the outer race 8 when the above sleeve 31 is inwardly engaged with an inside end opening of the outer race 8. Compared with the arrangement shown in FIGS. 19 and 20 into which the cover formed from a metallic sheet is incorporated, this arrangement into which the above cover 18a made of synthetic resin is incorporated is advantageous in that the number of components can be reduced so that the combining work can be simplified and the manufacturing cost of the bearing unit can be lowered, and further the cover made of synthetic resin can be made lighter than the cover made of metal.

However, even in the rolling bearing unit having a rotating speed detector shown in FIG. 23, the following problems to be solved may be encountered. When an automobile is running in a rainy day, muddy water is splashed on the cover 18a and the outer race 8, and further in the case of washing an automobile, water is sprayed on the cover 18a and the outer race 8 with high pressure by a washing machine. In this case, both muddy water and washing water are referred to as muddy water hereinafter. When the muddy water enters the cover 18a and the outer race 8, not only the durability of the bearing unit is deteriorated but also the reliability of the rotating speed detector in affected.

For example, in the conventional arrangement shown in FIG. 23, muddy water enters the cover 18a and the outer race 8 through the following two passage denoted by (1) and (2).

(1) A first minute clearance formed between an outer circumferential surface of the sleeve 31 and an inner circumferential surface of the inside end portion of the outer race 8.

(2) A second minute clearance formed between an inner circumferential surface of the sleeve 31 and an outer circumferential surface of the cover 18a made of synthetic resin.

The first minute clearance is made by minute irregularities which inevitably exist on the outer circumferential surface of the sleeve 31. That is, it is inevitable that minute irregularities of several tens μm exist on the surface of the sleeve 31 formed from a metallic sheet such as a stainless steel sheet. For this reason, even when the sleeve 31 is press-fitted into the inside end opening of the outer race 8, the above first minute clearance is made, and there is a possibility that muddy water enters the bearing unit through the first minute clearance.

The above second minute clearance is made by a difference between the thermal expansion coefficient of a metal composing the sleeve 31 and the thermal expansion coefficient of synthetic resin composing the cover 18a. There is a possibility that muddy water enters the bearing unit through the second minute clearance described above.

In the case of the arrangement of the fourth conventional example shown in FIG. 23, it is difficult to assemble a bearing unit without using an exclusive press. Therefore, in a garage having no exclusive press, it is impossible to replace the sensor 20a attached to the cover 18a. As a result, when the rolling bearing unit having a rotating speed detector is inspected and repaired, the cost is raised. When the cover 18a is pulled out from the outer race 8, due to a high frictional force acting between the outer circumferential surface of the sleeve 31 and the inner circumferential surface of the end portion of the outer race 8, an end edge (a left end edge in FIG. 23) of the sleeve 31 strongly pushes an outer circumferential portion 52 close to the fore end portion of the synthetic resin composing the cover 18a. As a result, a base of the portion 52 made of synthetic resin is given a shearing force, and there is a high possibility that the portion 52 is damaged. When the portion 52 is damaged, the cover 18a and the sensor 20a embedded in the cover 18a can not be used again, which raises the cost of inspection and maintenance.

In order to prevent the shearing force from being given to the outer circumferential portion 52 close to the fore end portion when the cover 18a is pulled out from the outer race 8, it can be considered to increase an outer diameter of the flange portion 53 formed in the bass portion (the right end portion of FIG. 23) of the sleeve 31. When the outer diameter of the flange portion 53 is increased and an outer circumferential portion of the flange portion 53 is protruded from the outer circumferential surface of the cover 18a so that a tool can be hooked at this protruding portion, it is possible to prevent the occurrence of a shearing force which may cause a damage of the portion 52. However, when the outer diameter of the flange portion 53 is simply increased, muddy water sprayed onto the outer side of the flange portion 53 in a rainy day or in the process of washing an automobile tends to enter the inside of the outer race 8 through a contact surface of the sleeve 31 with the outer race 8. Therefore, it is not appropriate to adopt the above countermeasure.

In the rolling bearing unit having a rotating speed detector shown in FIG. 23 into which the cover 18a made of synthetic resin is incorporated, it is possible to reduce the initial cost. On the other hand, it is difficult to remove the cover 18a from the outer race 8 in the process of maintenance and replacement of parts. When the cover 18a is forcibly removed from the outer race 8 in the arrangement shown in FIG. 23, there is a possibility that the end portion 51 of the cover 18a is damaged due to a frictional force that acts between the outer circumferential surface of the sleeve 31 and the inner circumferential surface of the outer ring 8. When a portion of the sleeve 31 and a portion of the covet 18a are outwardly protruded from the outer circumferential surface of the end portion of the outer race 8 in the diametric direction, it is possible to remove the cover 18a from the outer race 8 without damaging the cover 18a. However, when the above means is adopted for removing the cover 18a, the outer diameter of the cover 18a is increased, so that the cover 18a tends to interfere with other parts. Accordingly, the degree of freedom is deteriorated in the design of an automobile.

SUMMARY OF THE INVENTION

A first object of the present invention is to provide a rolling bearing unit having a rotating speed detector in which the rolling bearing unit includes a cover made of synthetic resin and a single seal ring which is attached to the cover and which is capable of preventing the entrance of muddy water into the cover and the outer race through the first and the second clearance.

A second object of the present invention is to provide a rolling bearing unit having a rotating speed detector in which the rolling bearing unit includes a cover having a main body made of synthetic resin and an engaging portion which is made of metal and engaged with an outer race so that the cover is capable of ensuring a sufficiently high sealing property.

A third object of the present invention is to provide a rolling bearing unit having a rotating speed detector in which the rolling bearing unit includes a cover that can be easily detached from a stationary race such as an outer race without particularly increasing the outer diameter of the cover made of synthetic resin.

The rolling bearing unit having a rotating speed detector, according to the first object of the present invention, includes: an outer race on the inner circumferential surface of which an outer raceway is provided in the same manner as the conventional rolling bearing unit having a rotating speed detector, the outer race being not rotated when the rolling bearing unit is used; an inner race, the outer circumferential surface of which is opposed to the above inner circumferential surface of the outer race, so that an inner raceway is formed on the outer circumferential surface of the inner race; a plurality of rolling elements arranged between the outer raceway and the inner raceway so that the rolling elements can be freely rolled; a tone wheel fixed to the inner race, the characteristic in the circumferential direction of which is alternately changed at regular intervals; a cover made of synthetic resin fixed to an inside end opening of the outer race; a sensor opposed to the tone wheel while the sensor is embedded in synthetic resin composing the cover; and a cylindrical sleeve made of metal fixed onto a circumferential surface of the opening of the cover, the cover being fixed to the outer race when one circumferential surface of the sleeve is engaged with a circumferential surface of the end portion of the outer race.

A minute clearance formed on an engaging surface between the sleeve and the outer race is defined as a first minute clearance. A minute clearance formed in a contact portion of the sleeve with the synthetic resin composing the cover is defined as a second minute clearance. A minute clearance formed between the outer race and the cover is defined as a third minute clearance. In this case, the first minute clearance and the third minute clearance, which are arranged in series to each other, make a first leaking passage, and the second minute clearance and the third minute clearance, which are arranged in series to each other, make a second leaking passage.

In the rolling bearing unit having a rotating speed detector according to the first object of the present invention, there is provided one piece of seal ring between the cover and the outer race at a position located in series to both the first and the second leaking passage. In order to arrange one piece of seal ring such as an O-ring, an annular flat packing and a ring-shaped seal member at a position located in series to both the first and the second leaking passage, for example, an end surface of the cover is not covered with the sleeve, and synthetic resin is exposed onto the end surface, and the seal ring is arranged between the end surface and the end surface of the outer race.

The rolling bearing unit having a rotating speed detector, according to the first object of the present invention, includes: an element to be detected, concentrically fixed to one portion of the inner race, the element having the characteristic which is alternately changed at regular intervals in the circumferential direction; a cover engaged with and fixed to an opening end portion of the outer race; a sensor held by a portion of the cover and opposed to the element to be detected so as to detect a rotating speed of the element; and a signal taking means for taking out a detection signal from the sensor. The above cover includes: a main body made of synthetic resin in which the sensor is embedded, the main body covering an opening end portion of the outer race; and a sleeve formed from a metallic sheet into an annular shape, the section of which is an L-shape, the sleeve being embedded in a portion of the main body close to the outer circumference. The sleeve includes: a cylindrical portion, the outer diameter of which is determined so that the sleeve can be freely fixed to an opening end portion of the outer race; and a flange portion bent at an end edge of the cylindrical portion in the diametric direction. The flange portion is combined with the main body under the condition that the entire flange portion and a portion of the cylindrical portion close to the flange portion are embedded in a portion of the main body close to the outer circumference.

A portion of the cylindrical portion close to its fore end is inwardly engaged with the opening end portion of the outer race, and under the condition that one side of the main body is confronted with an end surface of the outer race, a groove or a plurality of grooves capable of engaging with a tool are formed between one side of the main body and an end surface of the outer race. An outer circumferential edge portion of the flange portion is located at a position outside the bottom surface of the groove or the plurality of grooves in the diametric direction. A seal ring made of elastic material is attached to a portion where one side of the main body and the end surface of the outer ring are confronted with each other, so that the confronting portion can be tightly sealed.

When the rolling bearing unit having a rotating speed detector according to the present invention composed in the above manner holds a suspension of a wheel, or when the rolling bearing unit having a rotating speed detector detects a rotating speed of a wheel, the operation is the same as that of the conventional example described before. According to the rolling bearing unit having a rotating speed detector, the entrance of foreign objects such as muddy water into the cover can be prevented by one piece of seal ring. Therefore, it is possible to realize a highly reliable arrangement of the rolling bearing unit at a low manufacturing cost.

According to the present invention, the cover can be attached to and detached from the unit without damaging a main body made of synthetic resin composing the cover. Further, it is possible to positively prevent muddy water from entering the inside of the outer race.

In the rolling bearing unit having a rotating speed detector according to the second object of the present invention, the cover includes a main body made of synthetic resin, and a sleeve made of a metallic sheet. The sensor is embedded in the main body. The main body is composed in such a manner that a cylindrical portion capable of being freely confronted with an end surface of the outer race is formed on one side of a sheet portion, the size of which is sufficiently large to cover an opening end portion of the outer race. Concerning the sleeve, a section of the sleeve is formed into a crank-shape in which a small diameter portion and a large diameter portion are continuously connected with each other by a step portion, and the entire sleeve is formed into an annular shape. The small diameter portion of the sleeve, which is a bass portion, is embedded in the cylindrical portion. A seal ring is fitted inside the annular groove surrounded by the three surfaces of the inner diameter surface close to the base end of the large diameter portion, the outer circumferential surface close to the fore end of the cylindrical portion, and one side of the step portion. Under the condition that the fore end portion of the large diameter portion is outwardly engaged with the opening end portion of the outer race, the seal ring is elastically interposed between the opening end surface of the outer race and one surface of the step portion. In this way, a confronting portion of the opening end surface of the outer race and the fore end surface of the main cylindrical portion composing the cover is tightly sealed.

The rolling bearing unit having a rotating speed detector, according to the third object of the present invention, includes a stationary race, on the stationary side circumferential surface of which a stationary side raceway is provided, the stationary race being not rotated when the rolling bearing unit is used; a rotating race, the rotating side circumferential surface of which is opposed to the above stationary side circumferential surface of the stationary race, so that a rotating side raceway is formed on the outer circumferential surface of the rotating side race; a plurality of rolling elements arranged between the stationary side raceway and the rotating side raceway so that the rolling elements can be freely rolled; a tone wheel fixed to the rotating race, the characteristic in the circumferential direction of which is alternately changed at regular intervals; a closing plate to close at least a portion of the end opening of the stationary race; a cover made of synthetic resin provided on one side of the closing plate, the cover having an engaging cylindrical portion; and a sensor opposed to the tone wheel under the condition that the sensor is embedded in a portion of the cover. The cover is fixed to the stationary race when the engaging cylindrical portion is engaged with the circumferential surface of the end portion of the stationary race.

In the rolling bearing unit having a rotating speed detector according to the third object of the present invention, in the flange portion protruding in the diametric direction from the circumferential surface of the engaging cylindrical portion in the circumferential edge portion of the cover, a plurality of confronting portions and cutout portions are alternately formed in the circumferential direction. When the confronting portion confronts an end surface of the stationary race in the axial direction, the cover can be positioned with respect to the stationary race. The cutout portions can provide a clearance between the end surface of the stationary race and the engaging cylindrical portion, into which a tool is inserted to pull out the engaging cylindrical portion from the stationary race.

When the rolling bearing unit having a rotating speed detector according to the present invention composed in the above manner holds a suspension of a wheel, or when the rolling bearing unit having a rotating speed detector detects a rotating speed of a wheel, the operation is the same as that of the conventional example described before.

According to the rolling bearing unit having a rotating speed detector in the present invention, it is possible to reduce the manufacturing cost when the cover is made of synthetic resin. Further, even when the outer diameter of the cover is not extended, the cover can be easily detached from the stationary race. Furthermore, the cover and the sensor embedded in the cover can be positively positioned with respect to the stationary race.

When the cover is detached from the stationary race, the engaging cylindrical portion of the cover is pulled out from the stationary race under the condition that an end portion of the tool is engaged with the plurality of cutout portions. On the other hand, when the confronting portion arranged at a position away from each cutout portion in the circumferential direction confronts an end surface of the stationary race, the cover and the sensor embedded in the cover can be positioned with respect to the stationary race.

Since the cover is positioned by each confronting portion and the cutout portions for engaging with the end portion of the tool are intermittently formed in the circumferential direction, the size of the cutout portion in the radial direction can be extended without extending the outer diameter of the cover.

DETAILED DESCRIPTION OF THE EMBODIMENTS

Figure 1:
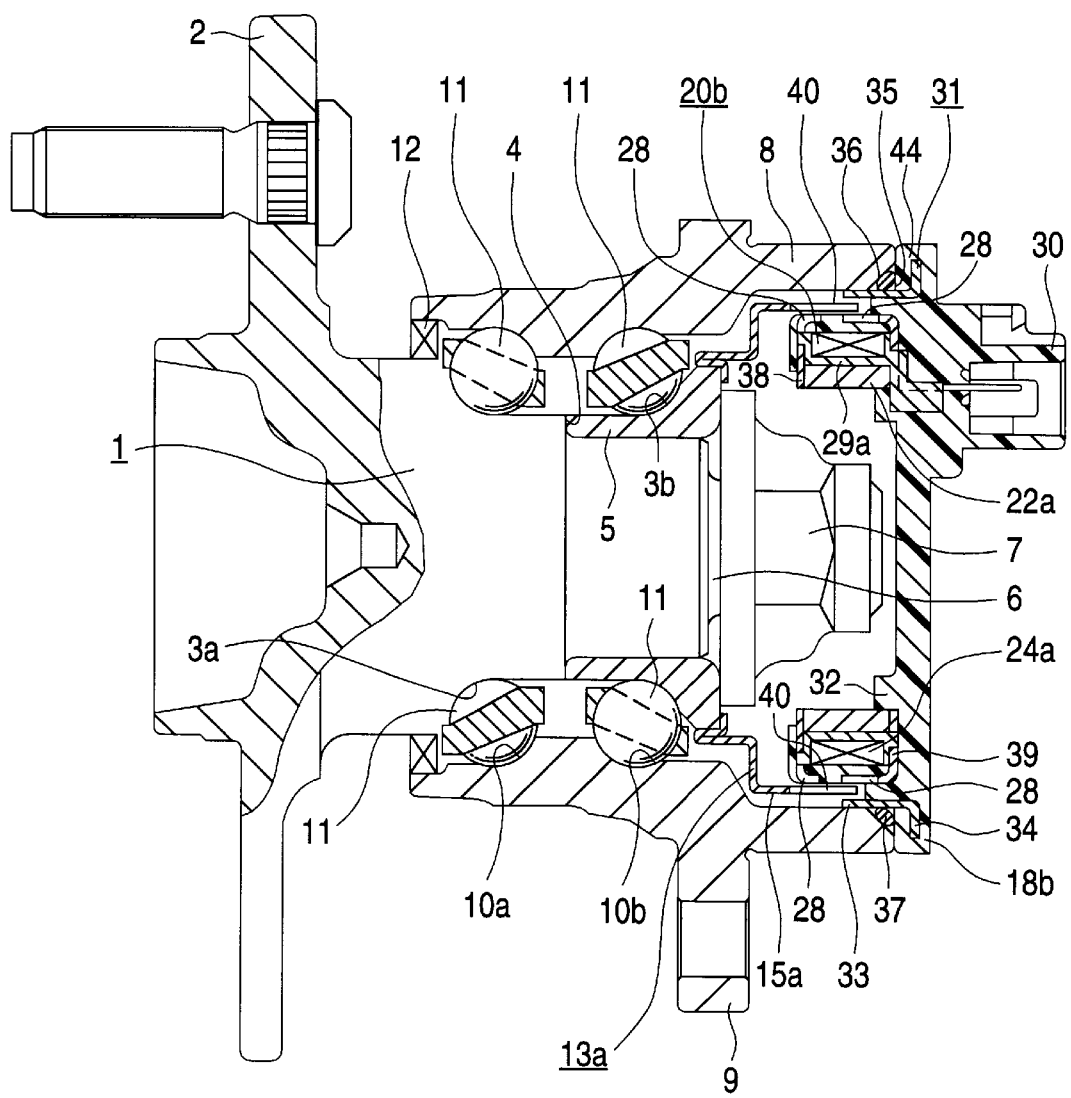
FIG. 1 is a cross-sectional view showing the first embodiment of the present invention.
Figure 2:
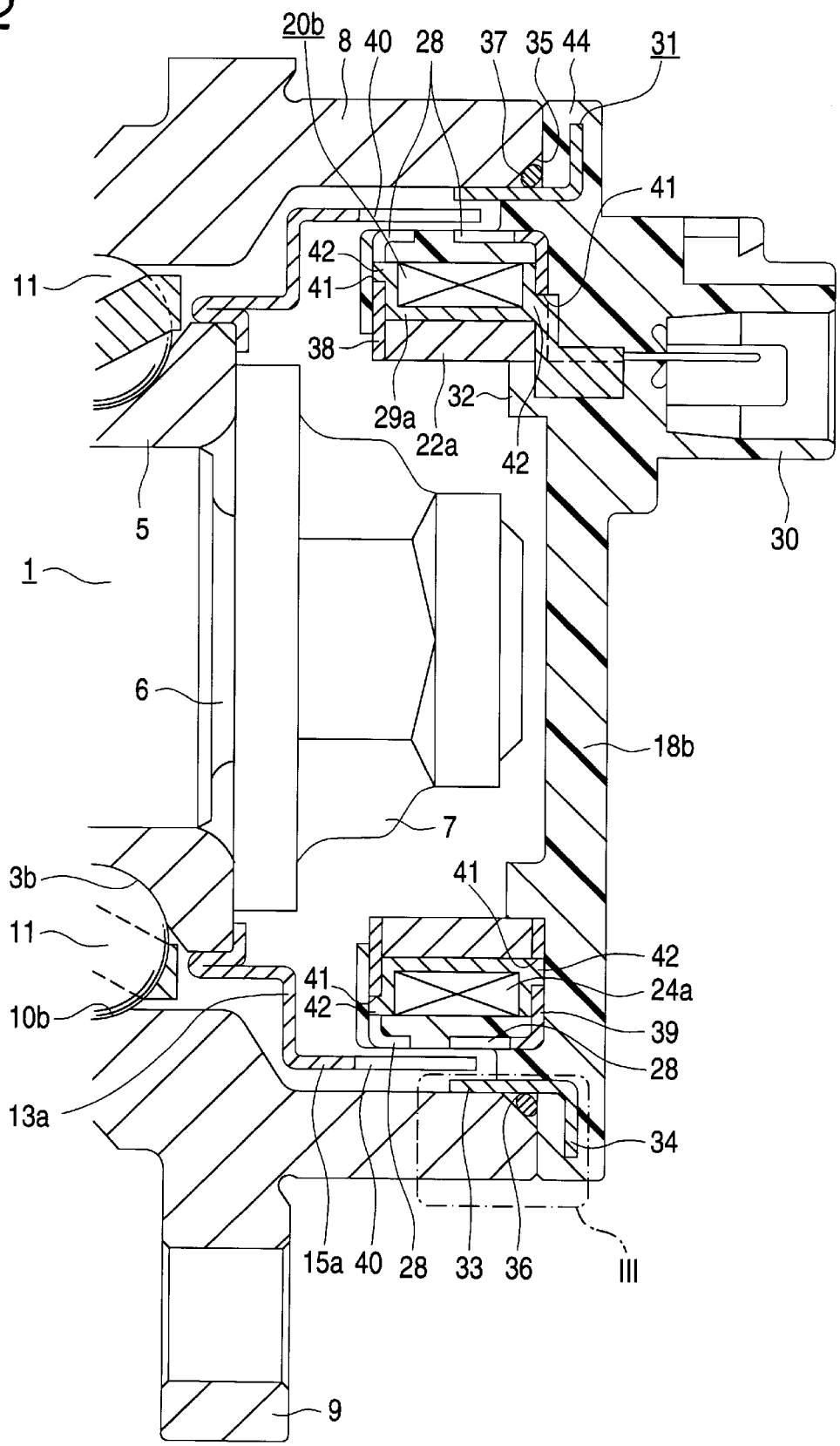
FIG. 2 is an enlarged view of the right portion of FIG. 1.
Figure 19:
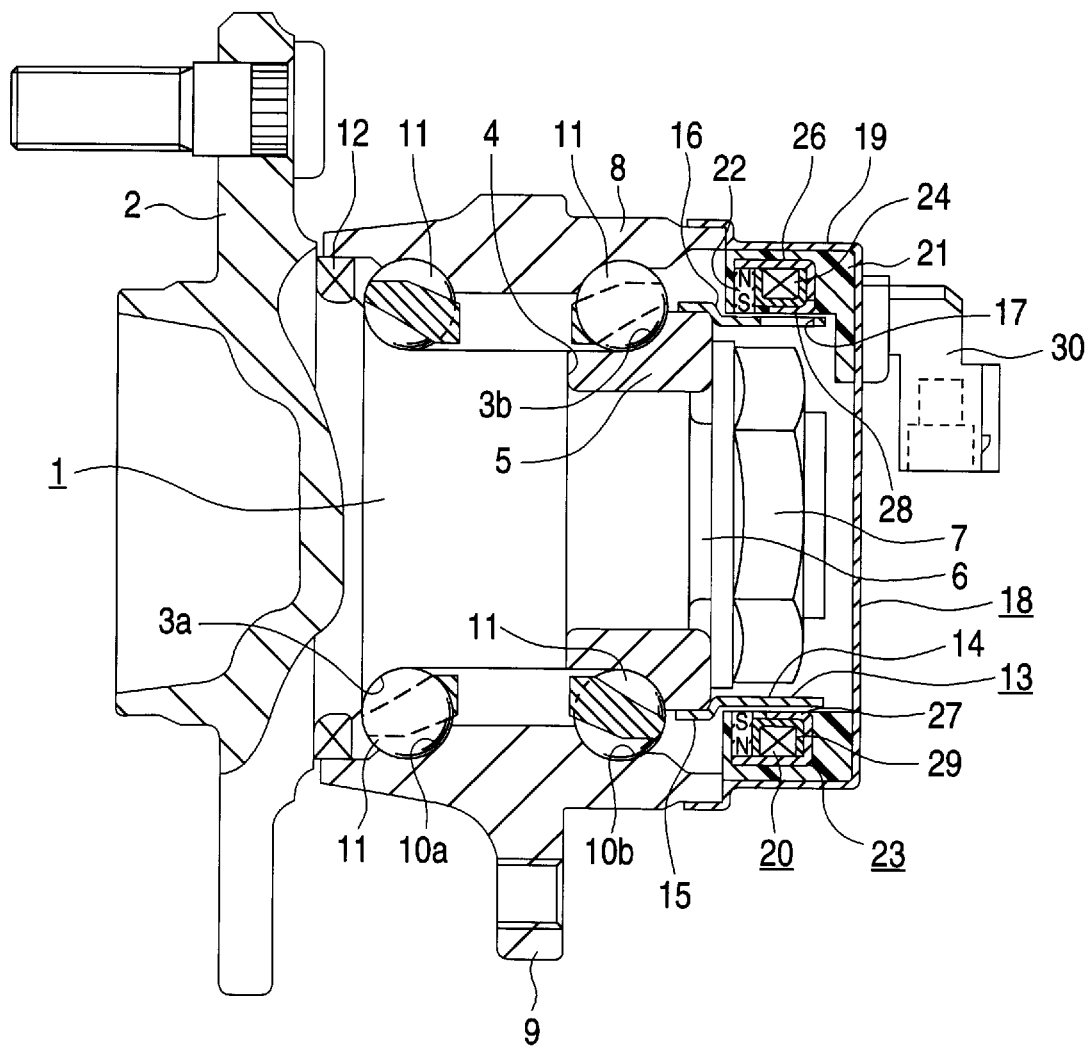
FIG. 19 is a cross-sectional view showing the first conventional example.

FIGS. 1 and 2 are views showing the first embodiment of the present invention. The characteristic of the rolling bearing unit having a rotating speed detector according to the present invention is a sealing structure of the engaging portion in which the cover 18b supporting the sensor 20b composing the rotating detector is engaged with the outer race 8 composing the rolling bearing unit. The structure of the rolling bearing unit is the same as that of the first conventional example shown in FIG. 19. Therefore, concerning the rolling bearing unit, like reference characters are used to indicate like parts in the drawings, and overlapping explanations are omitted or simplified here. The characteristic of the present invention will be mainly explained below.

A cover 18b made of synthetic resin is attached to an inside end opening of the outer race 8, so that the inside end opening of the outer race 8 is closed by the cover 18b. An inside end portion of the sensor 20b is embedded in an outside surface of the cover 18b. An outside half portion of the sensor 20b, which is formed into an annular shape, protrudes outside from the outside surface of the cover 18b. A connector 30 to take out a detection signal from the sensor 20b is integrally formed on an inside surface of the cover 18b. A protrusion 32 is formed on the outside surface of the cover 18b between the outer circumferential edge and the center of the cover 18b in the diametric direction. The protrusion 32 is formed to be annular. The inside end portion of the sensor 20b is embedded in the central portion of the protrusion 32 in the diametric direction.

A sleeve 31 is formed on an outer circumferential surface of the protrusion 32. The sleeve 31 is made from a metallic sheet such as a stainless steel sheet into an annular shape, the section of which is an L-shape. The sleeve 31 includes: a cylindrical portion 33; and a flange portion 34 which is bent at an inside edge of the cylindrical portion 33 outwardly in the diametric direction. The cylindrical portion 33 is provided along the outer circumferential surface of the protrusion 32 and protrudes outside from a fore end edge (outside edge) of the protrusion 32. The flange portion 34 is embedded in an outer circumferential edge portion of the cover 18b, that is the flange portion 34 is embedded in a central portion with respect to the thickness direction of the cover 18b, and the portion is located outwardly in the diametric direction of the protrusion 32. An outer circumferential edge of the flange portion 34 does not extend to an outer circumferential edge of the cover 18b, so that the outer circumferential edge of the flange portion 34 is embedded in the cover 18b.

The cover 18b provided with the sleeve 31 described above is engaged with and fixed to an inner circumferential edge of the inside end opening of the outer race 8. A chamfered portion is formed in the inner circumferential edge of the inside and opening of the outer race 8. When the inside end opening of the outer race 8 is closed by the cover 18b, the sleeve 31 is inwardly engaged with the inside end portion of the outer race 8, and a flange portion 44 which is formed on the outer cylindrical surface of the cover 18b is contacted with the outer race 8. An annular space 36 having a triangular section is formed under the above condition. The annular space 36 is surrounded by the three surfaces of the outside surface of the cover 18b contacted with the outer race 8 at the portion 44, the inner circumferential surface of the middle portion of the cylindrical portion 33, and the chamfered portion 35. In the rolling bearing unit having a rotating speed detector according to the present invention, an O-ring 37 serving as a seal ring is fitted in the space 36 under the condition that the O-ring 37 is elastically compressed.

Since the O-ring 37 is provided in the space 36 formed in the above manner under the condition that the O-ring 37 is elastically compressed, the intrusion of muddy water into the cover 18b and the outer race 8 can be positively prevented.

Figure 3:
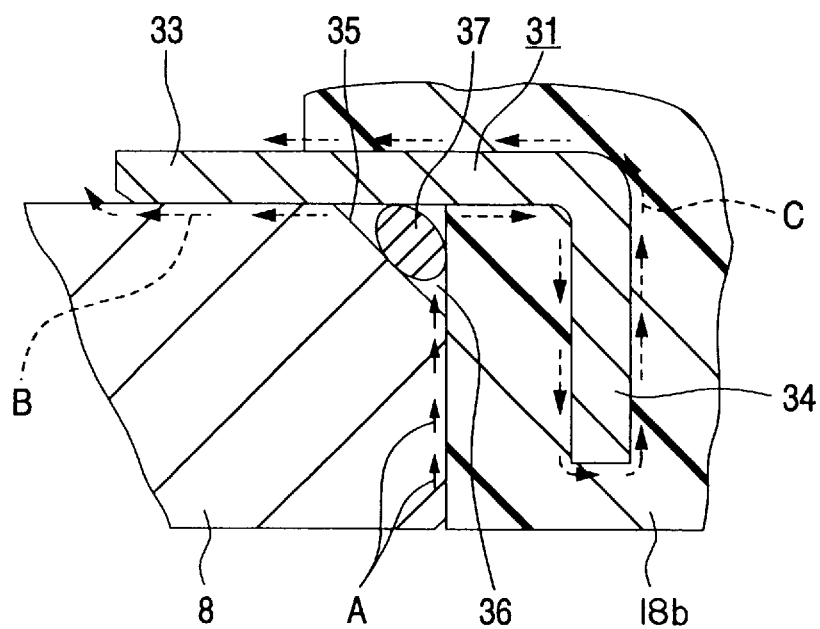
FIG. 3 is an enlarged view of the portion III of FIG. 2.

That is, as shown by arrows A of solid lines in FIG. 3, muddy water existing around the cover 18b and the outer race 8 enters a portion of the space 36 close to the outer circumference through a the third minute clearance which is formed between the inside end surface of the outer race 8 and the outside surface of the cover 18b. However, after muddy water has entered the space 36 on the outer circumferential side in this way, it is stopped by the O-ring 37. Therefore, muddy water does not enter the space 36 on the inner circumferential side. In this case, a first minute clearance is formed on an engaging surface between the inner circumferential surface of the sleeve 31 and the inside outer circumferential surface of the outer race 8, and a second minute clearance is formed in a contact portion between the sleeve 31 and the synthetic resin portion composing the cover 18b. Both one end of the first minute clearance and one end of the second minute clearance communicate with a portion of the space 36 close to the inner circumference. Accordingly, muddy water that has intruded from the third minute clearance into a portion in the space 36 close to the outer circumference does not intrude into the first minute clearance and the second one.

Therefore, the O-ring 37 is arranged in series to the first leakage passage (from arrow A to arrow B in FIG. 3) composed of the third minute clearance and the first one. Also, the O-ring 37 in arranged in series to the second leakage passage (from arrow A to arrow C) composed of the third minute clearance and the second one. Thus, the intrusion of muddy water into the outer race 8 and the cover 18b can be prevented by one piece of O-ring 37. That is, no muddy water flows into the first leakage passage and the second one as shown by arrows A, B and C in FIG. 3.

In the first embodiment, when a relative velocity between the opposed surfaces of the sensor 20b and the tone wheel 13a is increased and at the same time a magnetic resistance between both members 20b, 13a is simultaneously changed at two positions, a change in the output of the sensor 20b is greatly increased. The sensor 20b includes an annular permanent magnet 22a magnetized in the axial direction (the transverse direction in FIG. 1 and 2). An outside end surface (the left end surface in FIGS. 1 and 2) of the permanent magnet 22a is contacted with a base end portion (inside diametral end portion) of the stator 38, and an outer circumferential surface of a fore end portion (outside diametral end portion) of the stator 38 is opposed to an inner circumferential surface of the middle portion of the large diameter portion 15a composing the tone wheel 13a while a minute clearance is formed between the two surfaces. An inside end surface (the right and side in FIGS. 1 and 2) of the permanent magnet 22a in the axial direction is contacted with a base end portion (inside diametral end portion) of the second stator 39. An outer circumferential surface of a fore end portion (outside diametral end portion) of the second stator 39 is opposed to an inner circumferential surface of the inside end portion of the large diameter portion 15a in the axial direction while a minute clearance is formed between the two surfaces.

Cutout portions 40, 40 are formed in the inner half portion of the large diameter portion 15a composing the tone wheel 13a, and cutout portions 28, 28 are respectively formed in the fore end portions of the first stator 38 and the second one 39. Due to the foregoing, each portion is formed into a comb-tooth-shape. Of course, the pitches (the central angle pitches) of the cutout portions 40, 28 are the same. The phases of the cutout portions 28, 28 composed in the first stator 38 and the second one 39 are the same. Therefore, the through-holes 41, 41 formed in the first stator 38 and the second one 39 are engaged with the protrusions 42, 42 formed on the bobbin 29a around which a lead wire to compose the coil 24a is wound. The coil 24a is arranged in a portion surrounded by the permanent magnet 22a, the first stator 38 and the second stator 39. By a change in the density of magnetic flux flowing in these members 22a, 38, 39, a voltage is generated which changes at a frequency proportional to the rotating speed of the tone wheel 13.

Figure 20:
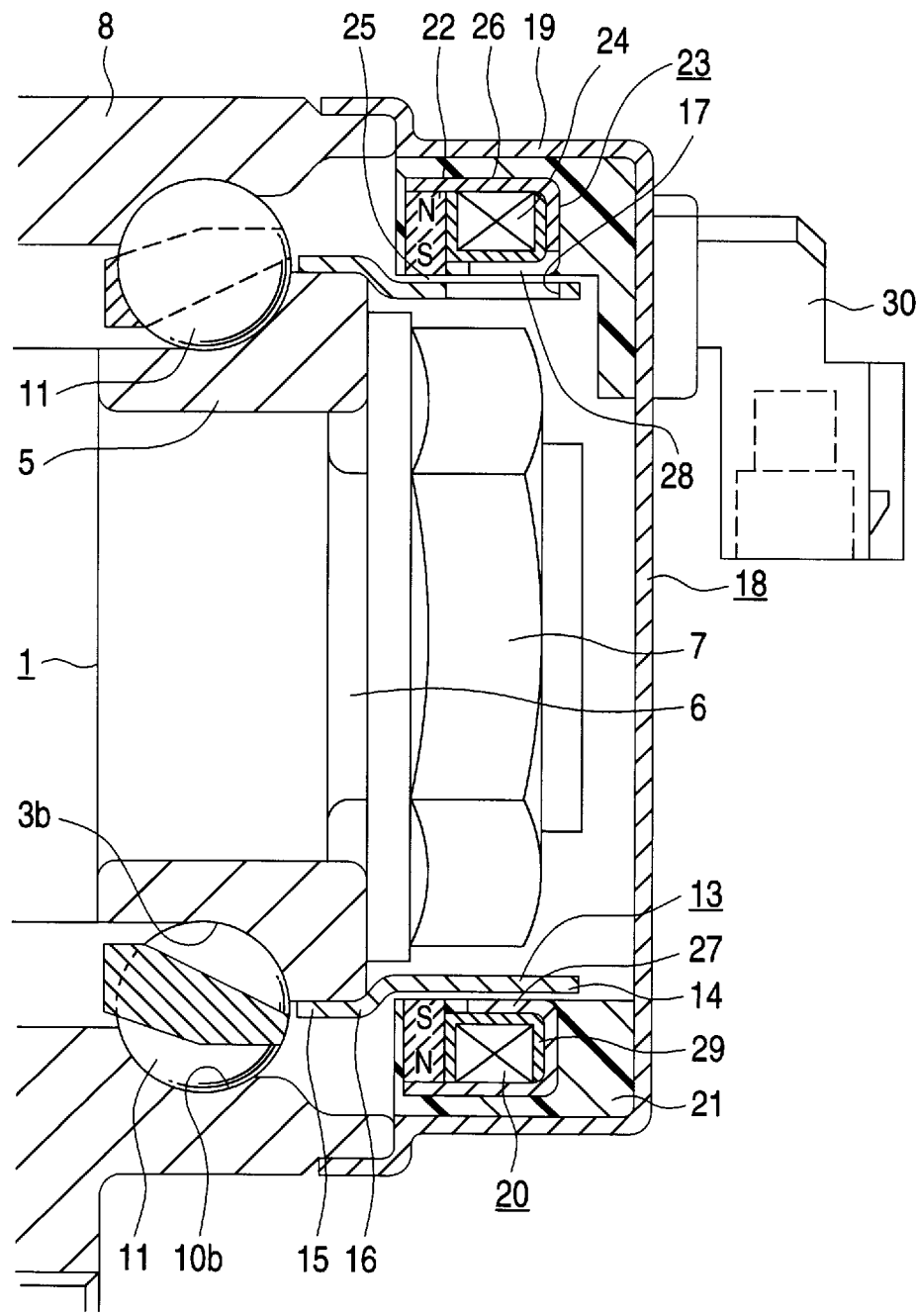
FIG. 20 is an enlarged view of the right portion of FIG. 19.

Due to the above arrangement, in accordance with the rotation of the tone wheel 13a, a resistance to the flow of magnetic flux is changed not only in a portion where the fore end portion of the first stator 38 is opposed to the large diameter portion 15a but also in a portion where the fore end portion of the second stator 39 is opposed to the large diameter portion 15a. Accordingly, a change in the magnetic flux density caused by the rotation of the tone wheel 13a is increased, and a high output can be provided by the sensor 20b. In the first embodiment, the sensor 20b is arranged on the inner diameter side of the large diameter portion 15a composing the tone wheel 13a, and an inner circumferential surface of the large diameter portion 15a in opposed to an outer circumferential surface of the sensor 20b. Therefore, the relative velocity between both circumferential surfaces can be increased more than the relative velocity of the conventional structure described before. When the relative velocity between both circumferential surface is increased, the output of the sensor 20b can be increased. In this connection, the structure of the rotating speed detector described above is not the main point of the present invention. Concerning the structure of the rotating speed detector, various type of structure including the conventional structure shown in FIGS. 19 and 20 may be adopted when the present invention is executed.

Figure 4:
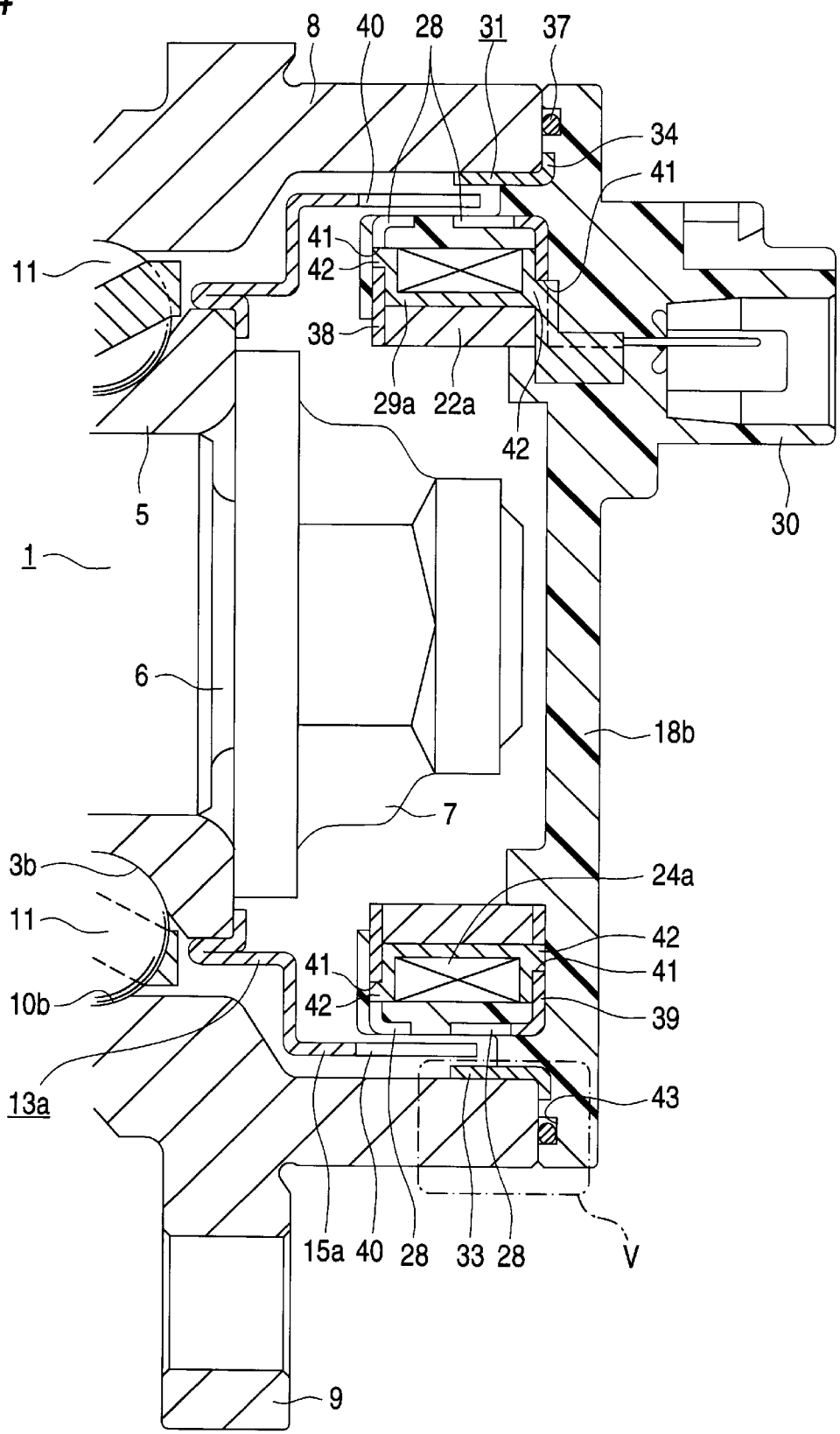
FIG. 4 is an enlarged view of the right portion of the second embodiment of the present.
Figure 5:
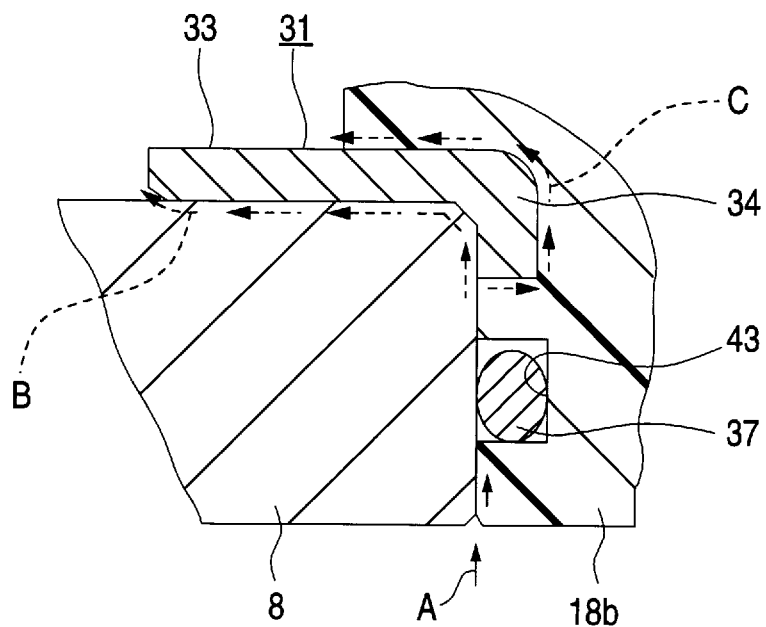
FIG. 5 is an enlarged view of the portion V of FIG. 4.

Next, FIG. 4 and 5 are views showing an arrangement of the second embodiment of the present invention. In the second embodiment, the flange portion 34 of the sleeve 31 is embedded in a portion on the outside surface of the cover 18b in such a manner that the flange portion 34 is arranged on the same surface as the outside surface of the cover 18b. All over the circumference, an engaging groove 43 is formed in the outside surface of the cover 18b which in closer to the outer circumferential edge of the cover 18b than the flange portion 34. An O-ring 37 is fitted in the engaging groove 43. The O-ring 37 is elastically contacted with the inside end surface of the outer race 8. Also, in the second embodiment, as shown by arrow A of a solid line in FIG. 5, muddy water that has intruded into the third minute clearance is stopped by the O-ring 37. Accordingly, it is possible to prevent the muddy water from flowing into the first minute clearance and the second minute clearance as shown by arrows B and C of broken lines in FIG. 5.

Figure 6:
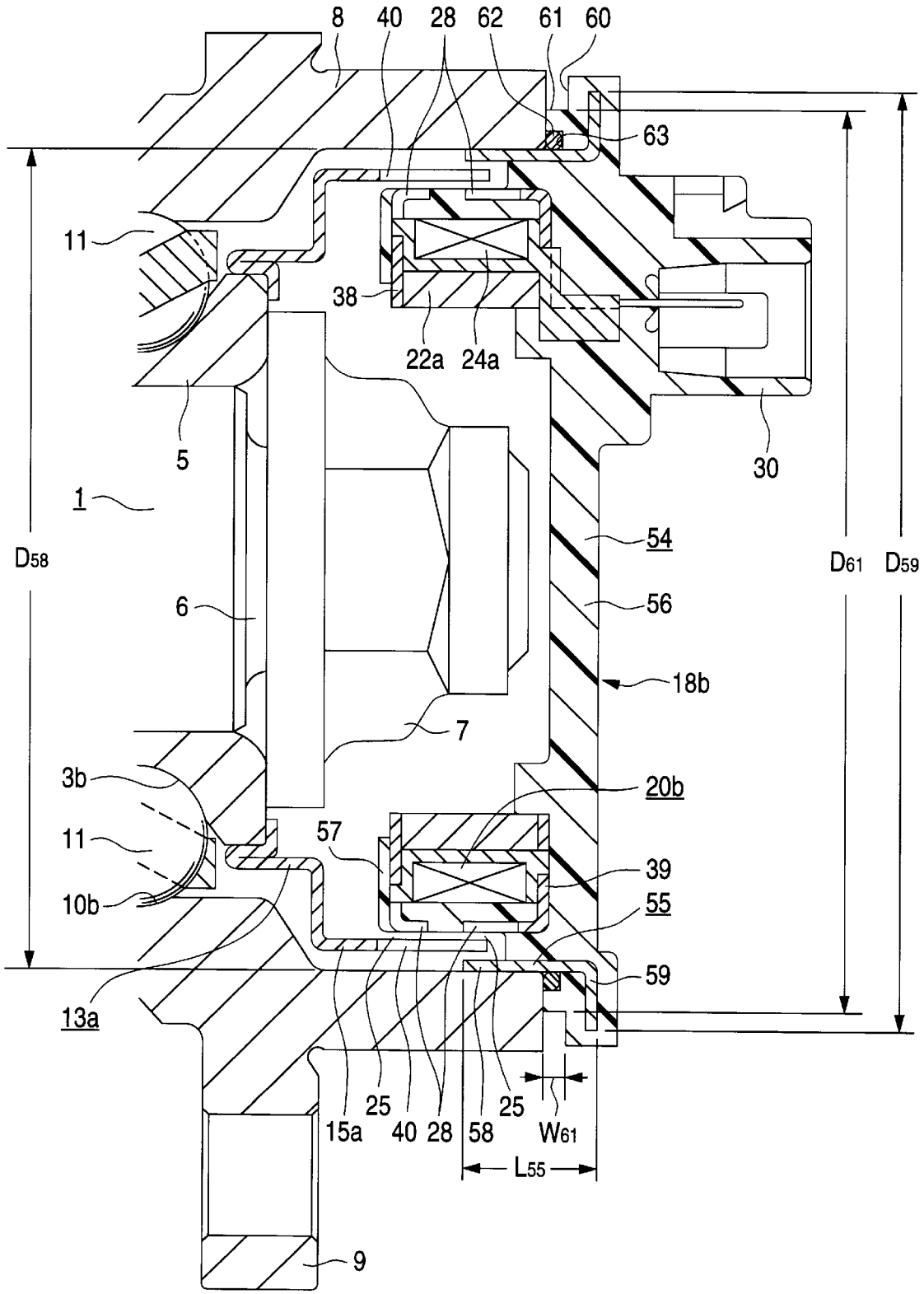
FIG. 6 is a cross-sectional view of the third embodiment of the present invention.

FIG. 6 is an arrangement view of the third embodiment of the present invention. The characteristic of the rolling bearing unit having a rotating speed detector according to the third embodiment is a structure in which the cover 18b supporting the sensor 20b composing the rotating detector is fixed to the outer race 8 composing the rolling bearing unit. The structure of the rolling bearing unit is the same as that of the first conventional example shown in FIG. 19. Therefore, concerning the rolling bearing unit, like reference characters are used to indicate like parts in the drawings, and overlapping explanations are omitted or simplified here. The characteristic of the present invention will be mainly explained below.

When a cover 18b composed of a main body 54 made of synthetic resin and a sleeve 55 formed from a metallic sheet is attached to an opening and portion (the right end portion of FIGS. 6 and 7) of the outer race 8, the inside and opening of the outer race 8 is closed. The main body 54 includes a disk portion 56 integrally formed from synthetic resin. The sensor 20b is embedded on the outside surface of the disk portion 56. The sensor 20b, which is formed into an annular shape, protrudes from the outer side surface of the disk portion 56. A connector 30 for taking out a detection signal from the sensor 20b is mounted on the inside surface of the disk portion 56. The connector 30 is formed integrally with the main body 54. A protrusion 57 which protrudes from the outside surface of the disk portion 56, composing the main body 54, is between the outer circumferential edge of the disk portion 56 and the center in the diametric direction. The protrusion 57 is formed to be annular. The sensor 20b is embedded in the protrusion 57.

The sleeve 55 is formed into an annular shape, the section of which is an L-shape, from a metallic sheet of high rigidity such as a steel sheet or a stainless steel sheet by means of burring conducted by a press. The sleeve 55 includes: a cylindrical portion 58, the diameter of which is formed to be a value so that the cylindrical portion 58 can be press-fitted into the opening end portion of the outer race 8; and a flange portion 59 bent at the inside edge of the cylindrical portion 58 outwardly in the diametric direction. In order to manufacture the above sleeve 55 from an inexpensive steel sheet by means of burring at low manufacturing cost, length $L_{55}$ of the sleeve 55 is restricted to be not more than 0.2 of diameter $D_{58}$ of the above cylindrical portion 58 ($L_{55} \leq 0.2 D_{58}$). When length $L_{55}$ and diameter $D_{58}$ are restricted as described above, it is possible to manufacture the sleeve 55 without using the method of deep drawing, the manufacturing cost of which is high. Of course, when an increase in the manufacturing cost is allowed, the third embodiment of the present invention is not restricted by the above restriction of the size.

When the main body 54 is made in conjunction with the connector 30 by means of injection molding, the sleeve 55 is embedded in a portion of the main body 54 close to the outer circumferential portion except for a fore end portion of the cylindrical portion 58 (the portion close to the left end in FIG. 6). When the sleeve 55 is embedded in the main body 54 together with the sensor 20b, both sore 55, 20b are concentrically set in the forming mold. When injection molding is conducted to make the main body 54 in the above condition, the entire flange portion 59 and a portion of the cylindrical portion 58 close to the base end (a portion close to the flange portion 59 located on the right in FIG. 6) of sleeve 55 are embedded in a portion of the main body 54 close to the outer circumference.

A step portion 60 is formed all over the circumference in the outer circumferential portion on the outside surface of the main body 54. Due to the existence of the step portion 60, under the condition that the fore end portion of the cylindrical portion 58 exposed from the outside surface of the main body 54 in inwardly engaged with the inside end opening of the outer race 8 and also under the condition that the outer circumferential portion on the outside surface of the main body 54 is confronted with the inside end surface of the outer race 8, a groove 61 capable of engaging with a tool can be formed all over the circumference between the outer circumferential portion on the outside surface of the main body 54 and the inside end surface of the outer race 8. When the size of the step portion 60 is restricted, the diameter $D_{61}$ of the bottom portion of the groove 61 is made to be smaller than the outer diameter $D_{59}$ of the flange portion 59 ($D_{61} < D_{59}$). Accordingly, the outer circumferential edge portion of the flange portion 59 is located at an outward position of the bottom of the groove 61 in the diametric direction. The width $W_{61}$ of the groove 61 is restricted so that an end portion of the tool used to remove the cover 18b from the outer race 8 can be positively inserted into the groove 61.

A seal ring (O-ring) 62 in made of elastic material such as rubber and elastomer in a portion where the outer circumferential portion on the outside surface of the primary body 54 in confronted with the inside end surface of the outer race 8. An engaging groove 63 is formed in the outer circumferential portion on the outside surface of the main body 54 which is a little inward with respect to the step portion 60 in the diametric direction. As described above, under the condition that the fore end portion of the cylindrical portion 58 is inwardly engaged with the inside end opening of the outer race 8 and also under the condition that the outer circumferential portion on the outside surface of the main body 54 is confronted with the inside end surface of the outer ring 8, the seal ring 62 is elastically compressed in the engaging groove 63, so that the seal ring 62 can be elastically contacted with the surfaces surrounding the seal ring 62 all over the circumference. Under the above condition, the seal ring 62 seals the portion where the outer circumferential portion on the outside surface of the main body 54 is confronted with the inside end surface of the outer race 8.

Even when the sleeve 55 is embedded in the main body 54 in the process of injection molding of the main body 54, it is inevitable that a minute clearance is formed between a metallic sheet composing the sleeve 55 and a member of synthetic resin composing the main body 54. In this case, there is a possibility that muddy water intrudes into the unit through the minute clearance. However, in the structure, of the present invention, the flange portion 59 composing the sleeve 55 is embedded in synthetic resin. Therefore, a boundary between the metallic plate and synthetic resin is not exposed to the outside on which muddy water is existing. Further, an opening end of this boundary is located at a position inward with respect to the seal ring 62 in the diametric direction. Therefore, this boundary is separate from the outside by the seal ring 62. Accordingly, there is no possibility that muddy water intrudes into the outer race 8 through the boundary.

In the rolling bearing unit having a rotating speed detector according to the third embodiment of the present invention provided with the cover 18b including the main body 54 and the sleeve 55 described above, the cylindrical portion 58 of the sleeve 55 is inwardly press-fitted into the inside end opening of the outer race 8. The seal ring 62 is previously attached into the engaging groove 63. The cylindrical portion 58 is pushed into the outer race 8 until the outer circumferential portion on the outside surface of the main body 54 confronts the inside and surface of the outer race 8, so that the seal ring 62 can be elastically compressed in the engaging groove 63. In this way, assembling work of the cover 18b to the outer race 8 in completed. The cover 18b in which the sensor 20b is embedded in this way in positively fixed to the outer race 8.

When the cover 18b is fixed to the inside end opening of the outer race 8, a fore end surface of the pushing jig is set at an outer circumferential portion on the inside surface of the main body 54. Accordingly, when the cover 18b is pushed to the outer race 8, a compressive stress is given to a portion of synthetic resin composing the main body 54 located inside the inside surface of the flange portion 59. When a tensile stress is applied to synthetic resin composing the main body 54 (especially at low temperature), the main body 54 tends to be damaged, that is, cracks tend to occur in the main body 54. However, when a compressive stress is applied, synthetic resin composing the main body 54 is less susceptible to damage. Accordingly, when the cover 18b is pushed to the inside opening of the outer race 8 so that the cover 18b can be fixed, there is no possibility that the main body 34 in damaged by stress.

When the cover 18b is detached from the inside end opening of the outer race 8, a fore end portion of the pulling jig is engaged with the groove 61 and pulled inside. In this case, in order to make the point of application locate at a position inward with respect to the outer circumferential edge of the flange portion 59 in the diametric direction, the fore and portion of the pulling jig is inserted into an inner portion of the groove 61. When the pulling jig is pulled inside under the above condition, while a portion of the synthetic resin composing the main body 54 located outside with respect to the outside surface of the flange portion 59 is being given a compressive stress, the cylindrical portion 58 is pulled out from the inside end opening of the outer race 8. Consequently, the cover 18b including the main body 54 is not damaged in the process of removing the cover 18b.

Figure 7:
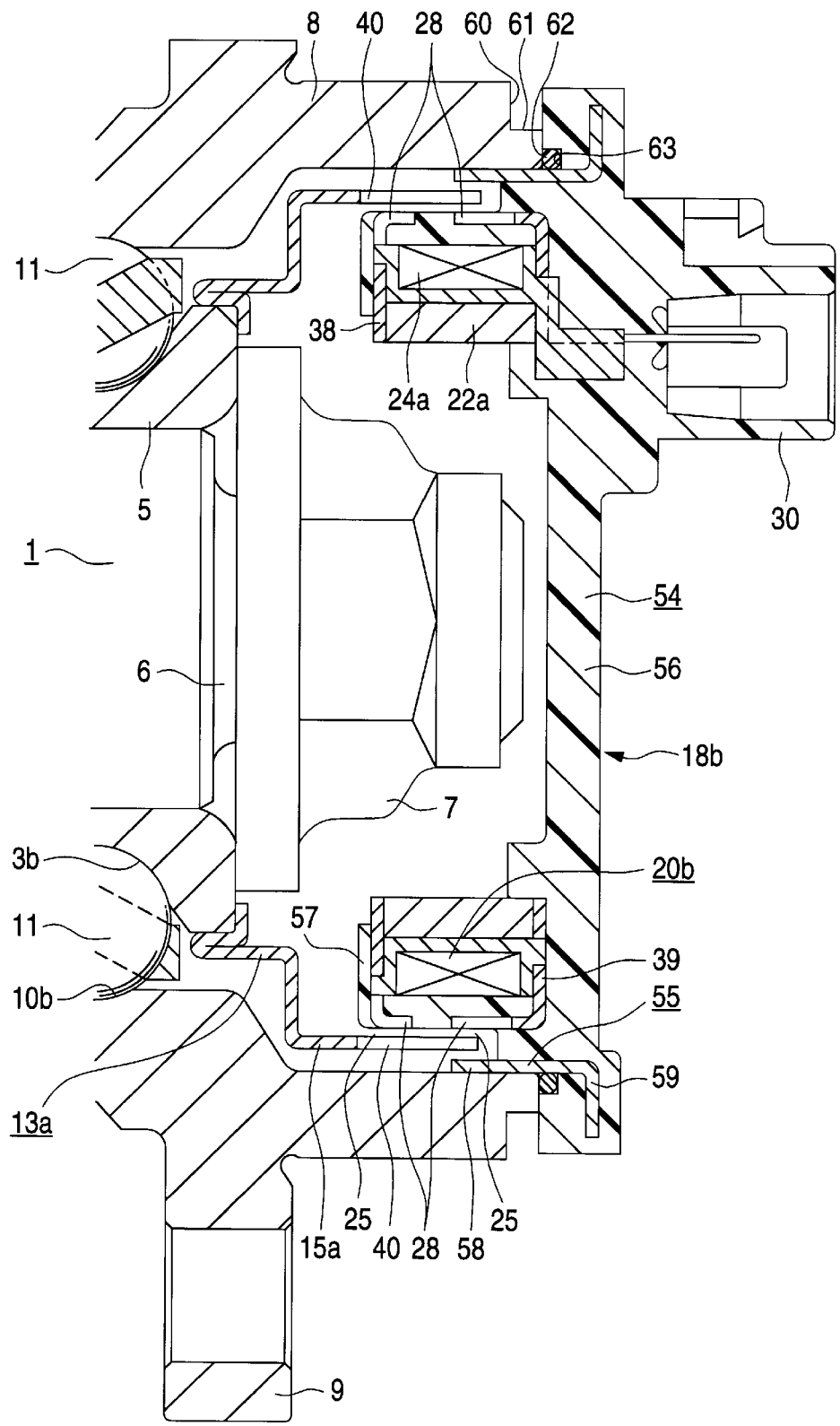
FIG. 7 is a cross-sectional view of the fourth embodiment of the present invention.

FIG. 7 is a view showing an arrangement of the fourth embodiment of the present invention. In the fourth embodiment, the step portion 60 composing the groove 61 to be engaged with the fore end portion of the pulling jig is not located at the outer circumferential portion on the outside surface of the main body 54, but it is formed at a half portion on the outer circumference on the inside end surface of the outer race 8. Other points and arrangements of the fourth embodiment are the same as those of the third embodiment described before.

Figure 8:
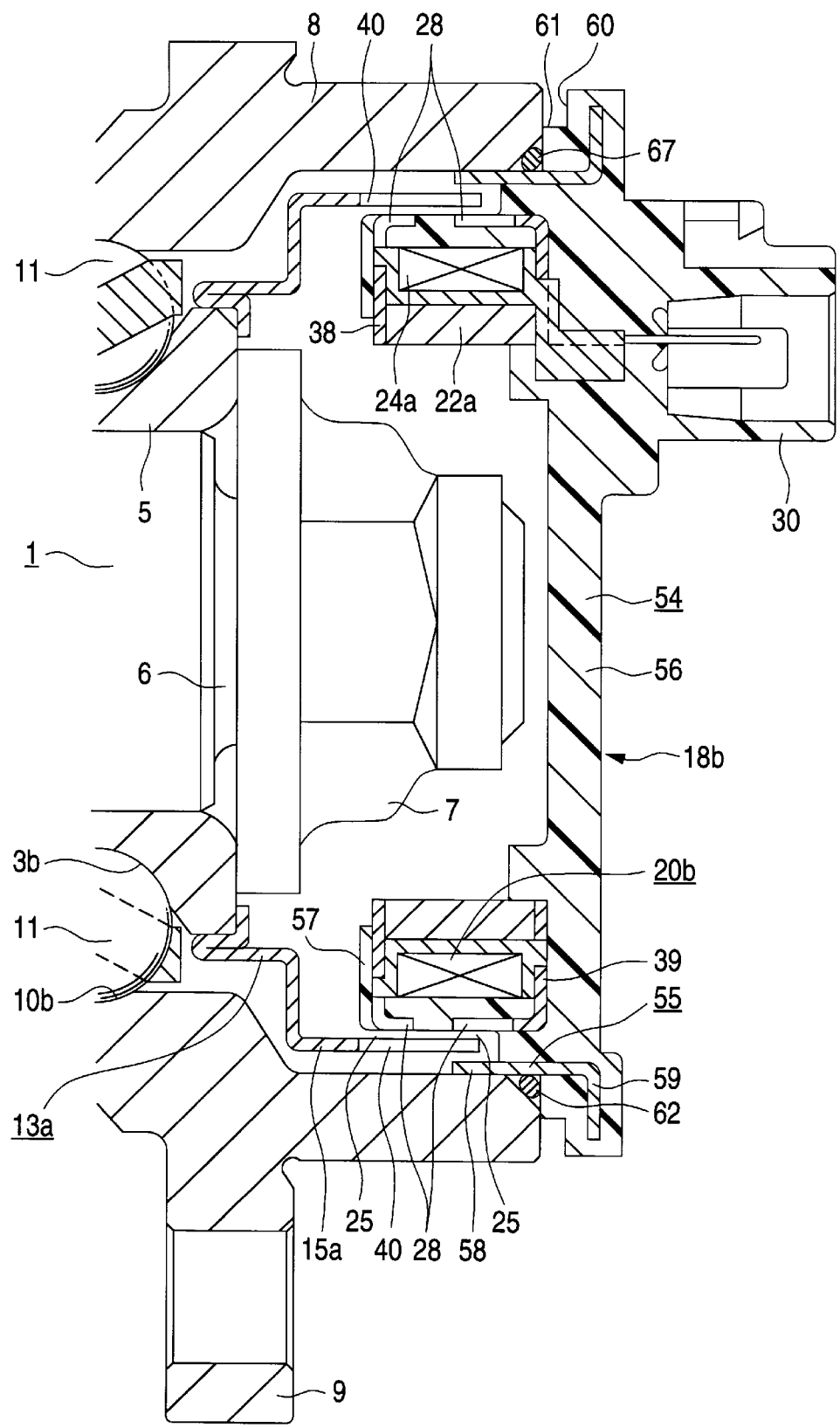
FIG. 8 is a cross-sectional view of the fifth embodiment of the present invention.

FIG. 8 is a view showing an arrangement of the fifth embodiment of the present invention. In the arrangement of the fifth embodiment, the engaging groove 63 (shown in FIG. 6 and 7) to be engaged with the seal ring 62 is omitted. Instead of that, the seal ring 62 is elastically held by the three portions of a chamfered portion 67 formed on the inner circumferential edge of the outer race 8, an outer circumferential surface of the middle portion of the cylindrical portion 58 composing the sleeve 55, and an outer circumferential portion on the outside surface of the main body 54. Other arrangements and functions are the same as those of the third embodiment described before.

Figure 9:
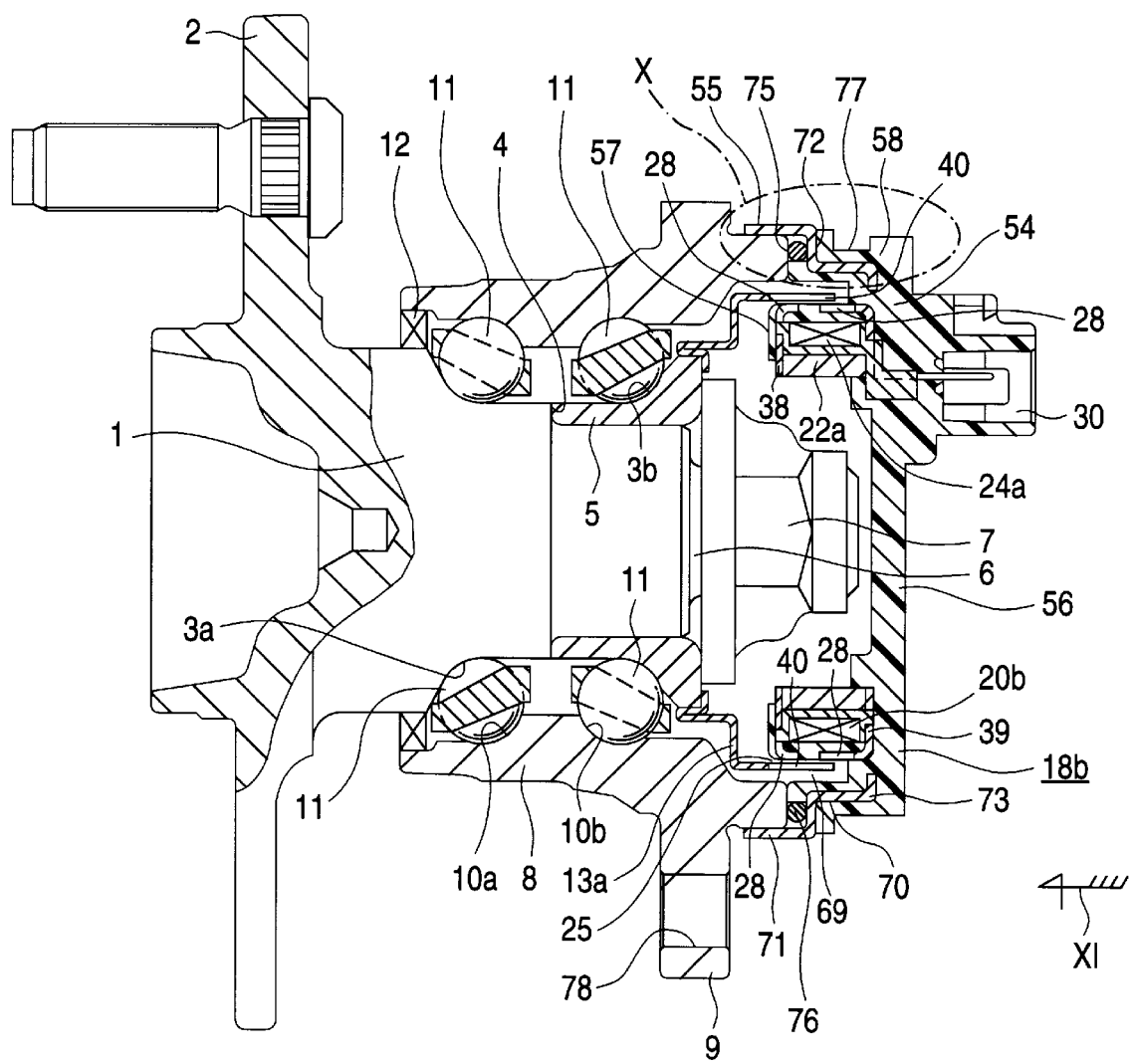
FIG. 9 is a cross-sectional view of the sixth embodiment of the present invention.
Figure 10:
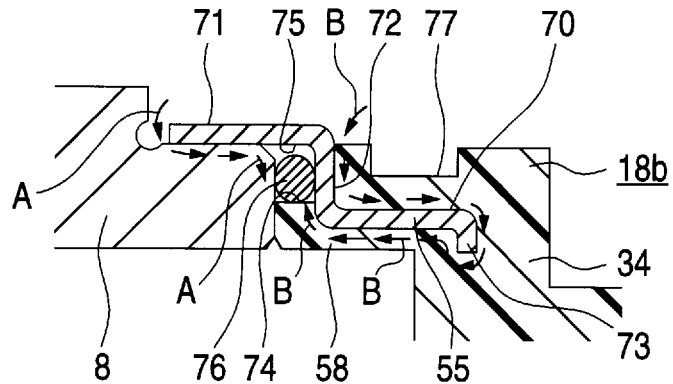
FIG. 10 is an enlarged cross-sectional view corresponding to the portion X of FIG. 9, for explaining a passage of intruding muddy water.
Figure 11:
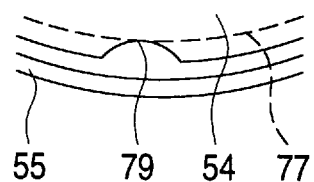
FIG. 11 is a view taken in the direction of arrow XI in FIG. 9.

FIGS. 9 to 11 are views showing an arrangement of the sixth embodiment of the present invention. The rolling bearing unit having a rotating speed detector according to the sixth embodiment has a structure wherein the portion of the cover 18b which supports the sensor 20b, composing the rotating speed detector, is fixed to the outer race 8. The structure of the rolling bearing unit is the same as that of the first conventional example shown in FIG. 19. Therefore, the overlapping explanations of the rolling bearing unit are omitted or simplified here, and the characteristic portions of the present invention will be explained below.

The above main body 54 includes: a disk portion 56 integrally made of synthetic resin; and a cylindrical portion 58 protruding from an outer circumferential portion on the outside surface of the disk portion 56.

A protrusion 57 is formed on the outside surface of the disk portion 56 composing the main body 54, and in a portion inward with respect to the cylindrical portion 58 in the diametric direction. The protrusion 57 is formed be annular. The sensor 20b is embedded in the protrusion 57 as shown by the hatching in FIG. 9. A cylindrical clearance 69 is formed between an outer circumferential surface of the sensor 20b embedded in the protrusion 57 and an inner circumferential surface of the disk portion 56. The cylindrical clearance 69 has the thickness which in uniform all over the circumference. Into the clearance 69, a portion of the tone wheel 13a described later can be freely inserted.

The sleeve 55 is formed into an annular shape, the section of which is a crank-shape, from a metallic sheet of high rigidity such as a steel sheet or a stainless steel sheet by means of burring conducted by a press or by means of deep drawing. The shape of the sleeve 55 is formed as follows. An outside end edge of the small diameter portion 70 and an inside end edge of the large diameter portion 71 are continuously connected with each other by a step portion 72, and when an inside and edge of the small diameter portion 70 is inwardly bent in the diametric direction, a bent engaging edge 73 is formed. The small diameter portion 70 of the sleeve 55 is embedded in a portion close to the base portion of the cylindrical portion 58. Under the condition that the small diameter portion 70 in embedded in the cylindrical portion 58, the bent end edge 73 enhances the joining strength of the small diameter portion 70 with respect to the cylindrical portion 50.

When the main body 54 is made by means of injection molding together with the connector 30, the sleeve 55 is embedded in an outer circumferential portion of the main body 54, except for a large diameter portion 71 and the step portion 72 of the sleeve 55. When the sleeve 55 is embedded in the main body 54 together with the sensor 20b, both members 55, 20b are set in a forming mold concentrically to each other. When the main body 54 is made by means of injection molding under the above condition, the small diameter portion 70 and the bent engaging edge 73, which compose the sleeve 55, are embedded in the cylindrical portion 58 composing the main body 54.

When an outer diameter of the fore end portion (the outside and portion) of the cylindrical portion 59 is made to be smaller than an outer diameter of the base end portion (the inside end portion), a step portion 74 is formed on the outer circumferential surface of the fore end portion of the cylindrical portion 58. Under the condition that the small diameter portion 70 is embedded in the cylindrical portion 58, one face (the inside surface) of the stop portion 72 of the sleeve 55 comes into contact with an inner end surface of the step portion 74. A base end portion of the large diameter portion 71 of the sleeve 55 is located around the step portion 74. Accordingly, in the fore end portion of the cylindrical portion 58, a groove 75 is formed all over the circumference which is surrounded by the three portions of an inner circumferential surface of the base end portion of the large diameter portion 71 composing the sleeve 55, an outside surface of the step portion 72, and an outer circumferential surface of the step portion 74 formed in the fore end portion of the cylindrical portion 59. A seal ring such as an O-ring 76 is fitted in the groove 75. A diameter (thickness) of the section of the O-ring in a free condition is larger than the depth of the groove 75. An inner diameter of the O-ring 76 in a free condition is a little smaller than the diameter of the outer circumferential surface of the step portion 74 which composes an inner circumferential side surface of the groove 45. Accordingly, when the O-ring 76 is incorporated into the groove 75, the inner circumferential edge of the O-ring 76 elastically comes into contact with the outer circumferential surface of the step portion 74 all over the circumference.

Further, the front half portion of the large diameter portion 71 protrudes to the front as compared with the fore end surface (the outside end surface) of the cylindrical portion 58. An inner diameter of the large diameter portion 71 in a free condition is a little smaller than the outer diameter of the inside end portion of the outer race 8 to which the cover 18b is fixed. In order to fix the cover 18b to the inside end portion of the outer race 8, an outside end edge of the large diameter portion 71 is aligned with the outer circumferential edge of the inside and portion of the outer race 8, and an outer circumferential portion on the inside surface of the main body 54 in pushed to the outer race 8. By this pushing work, the large diameter portion 71 in outwardly engaged with the outer race 8 while the diameter is being elastically expanded. This engaging work in continued until the fore end surface of the cylindrical portion 58 confronts the inside end surface of the outer race 8. Under the condition that the fore end surface of the cylindrical portion 58 confronts the inside end surface of the outer race 8, the O-ring is elastically compressed between the fore end surface and the inside end surface. The front half portion of the large diameter portion 71 is outwardly press-fitted to the inside end portion of the outer race 8.

A groove 77 is formed on an outer circumferential surface of the middle portion of the cylindrical portion all over the circumference or alternatively intermittently in the circumferential direction. When the rotating speed detector is overhauled, in order to remove the cover 18b from the outer race 8, a fore end portion of the tool is engaged with the groove 77. In this connection, the groove 77 may be formed all over the circumference, however, when the groove 77 in formed intermittently in the circumferential direction, an intensity of the compressive force given to the outer circumferential edge portion of the main body 54 can be reduced when the outer diametric portion of the main body 54 is pushed to the outer race 8 so as to attach the cover 18b to the outer race 8.

A screw hole 78 in formed in the attaching portion 9 on the outer circumferential surface of the outer race 8. Under the condition that the cover 18b is attached to the outer race 8, an arcuate cutout portion 79 is formed at a position on the outer circumferential edge of the main body 54 which coincides with the screw hole 78, as shown in FIG. 11. The cutout portion 79 is formed for preventing the occurrence of interference between an impact wrench to fasten a bolt to the screw hole 78 and the outer circumferential edge portion of the main body 54.

Even when the sleeve in embedded in the main body 54 in the process of injection molding of the main body 54, it is inevitable that a minute clearance is formed between a metallic sheet composing the sleeve 55 and synthetic resin composing the cylindrical portion 58 of the main body 54. In this case, there is a possibility that muddy water intrudes into the unit through the minute clearance. In the arrangement of the sixth embodiment of the present invention, even when muddy water attempts to intrude into the unit through a boundary between the metallic sheet and synthetic resin, the muddy water is stopped by the O-ring 76, so that the intrusion of muddy water into the outer race 8 can be prevented. Passages of the muddy water intruding into the outer race 8 through the attaching portion of the cover 18b are shown by arrows A—A and B—B in FIG. 10. In this case, the passage shown by arrow A—A is formed on an engaging surface formed by the inner circumferential surface of the large diameter portion 71 and the outer circumferential surface of the outer race 8, and the passage shown by arrow B—B is formed by the minute clearance described above. In the arrangement of the present invention, no muddy water intrudes into the outer race 8 through these passages because it in blocked by the O-ring 76.

Figure 12:
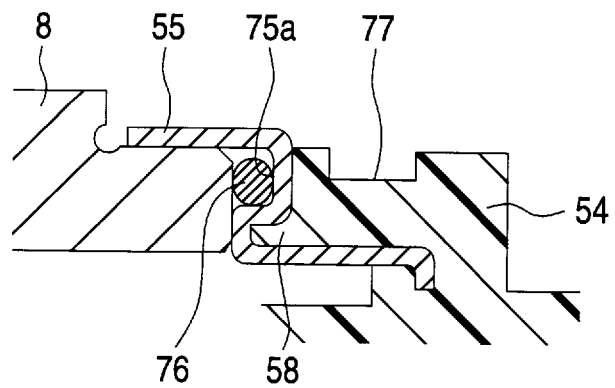
FIG. 12 is a view showing an unpreferable example in the same manner as FIG. 10.

On the other hand, when the groove 75a engaging with the O-ring 76 is formed in the sleeve 55a itself by means of deep drawing as shown in FIG. 12, it is impossible to prevent muddy water from intruding into the outer race 8 through a portion corresponding to the above minute clearance. According to the arrangement shown in FIG. 12, the manufacturing cost of the sleeve 55a is raised. Further, since the inner diameter of the sleeve 55a is reduced, it become difficult to increase the diameters of the sensor 20b and the tone wheel 13a, which will be described later, for the necessity of preventing the interference with the sleeve 55a. When it become difficult to increase the diameters. It also becomes difficult to increase an output of the sensor 20b.

In the rolling bearing unit having a rotating speed detector according to the sixth embodiment of the present invention in which the cover 18b including the main body 54 and the sleeve 55 are provided, the front half portion of the large diameter portion 71 of the sleeve 55 is press-fitted to the inside end opening of the outer race 8 as described before. In this way, the front half portion of the large diameter portion 71 is inwardly engaged with the inside end opening of the outer race 8. In this case, the O-ring 76 is previously attached into the groove 75. The outer diameter portion 71 is outwardly inserted into the outer race 8 until the fore end surface of the cylindrical portion 58 confronts the inside end surface of the outer race 8. Under the condition that the O-ring 76 is elastically compressed between the fore end surface and the inside and surfaces the assembling work of the cover 18b to the outer race 8 is completed. Under the above condition, the cover 18b in which the sensor 20b is embedded can be positively fixed to the outer race 8.

Figure 23:
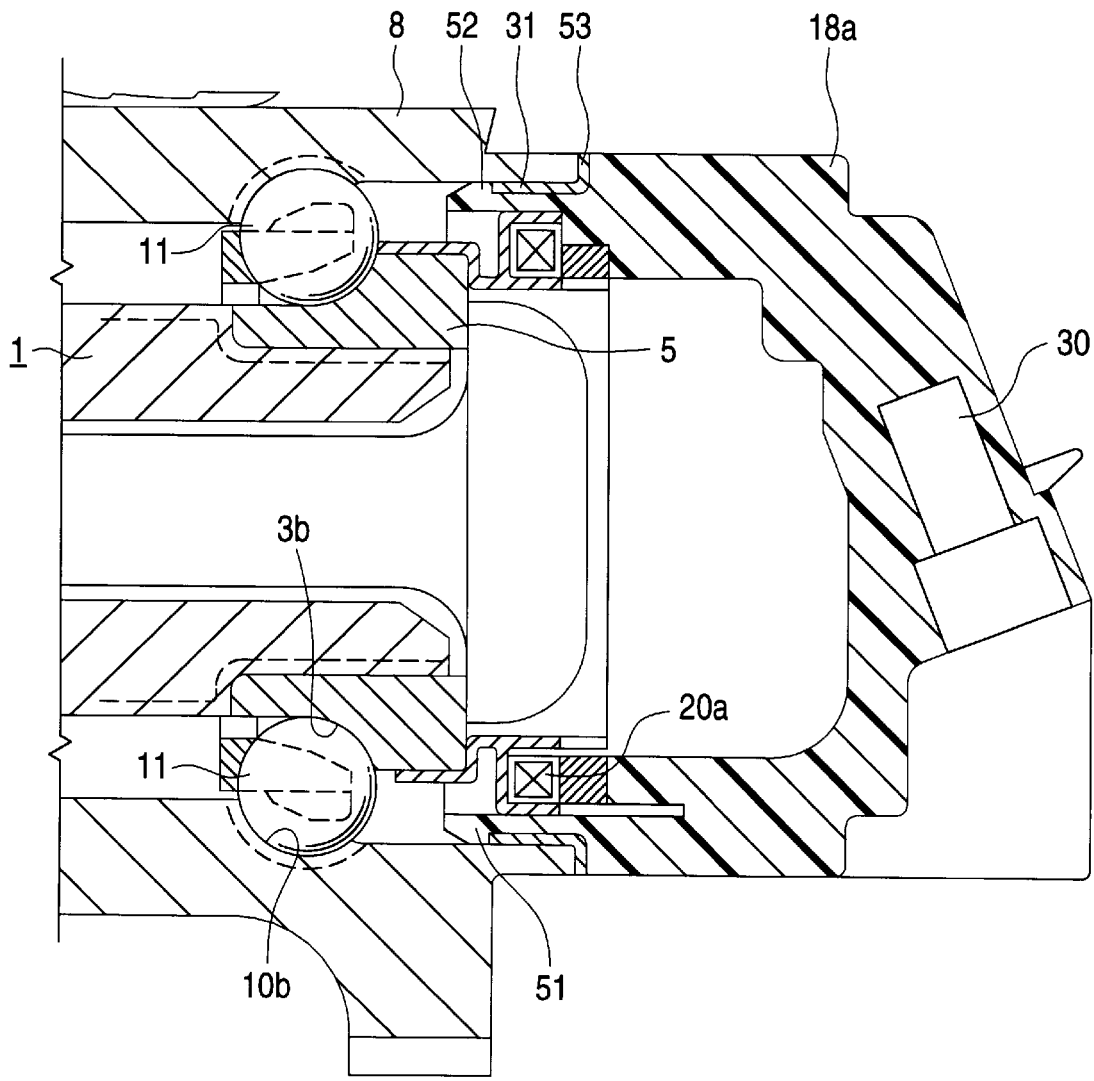
FIG. 23 is a partially cross-sectional view showing the fourth conventional example.

In this connection, the structure of the rotating speed detector described in the first to sixth embodiment is not the main point of the present invention. Concerning the structure of the rotating speed detector, various type of structure including the first to the fourth conventional example shown in FIGS. 19 and 23 may be adopted when the present invention is executed. For example, it is possible to adopt an arrangement in which the rotating speed is magnetically detected. Further, it is possible to adopt an arrangement in which the rotating speed is optically detected. In the case where the rotating speed is optically detected, a piece of metallic sheet on which a large number of slits are formed in the circumferential direction at regular intervals is used as an element to be detected, and a light emitting element and a light receiving element are used as a sensor. In the case of an arrangement in which the rotating speed is magnetically detected, it is possible to use a combination in which a tone wheel made of a permanent magnet and an active type sensor into which an MR element or a Hall element is incorporated are combined. Further, the engaging portion which engaging the fore end portion of the pulling jig is not necessarily served as a groove which is to be formed all over the circumference, but a plurality of grooves may be formed in the, circumferential direction. It is preferable that three or more grooves are formed in the circumferential direction.

Figure 21:
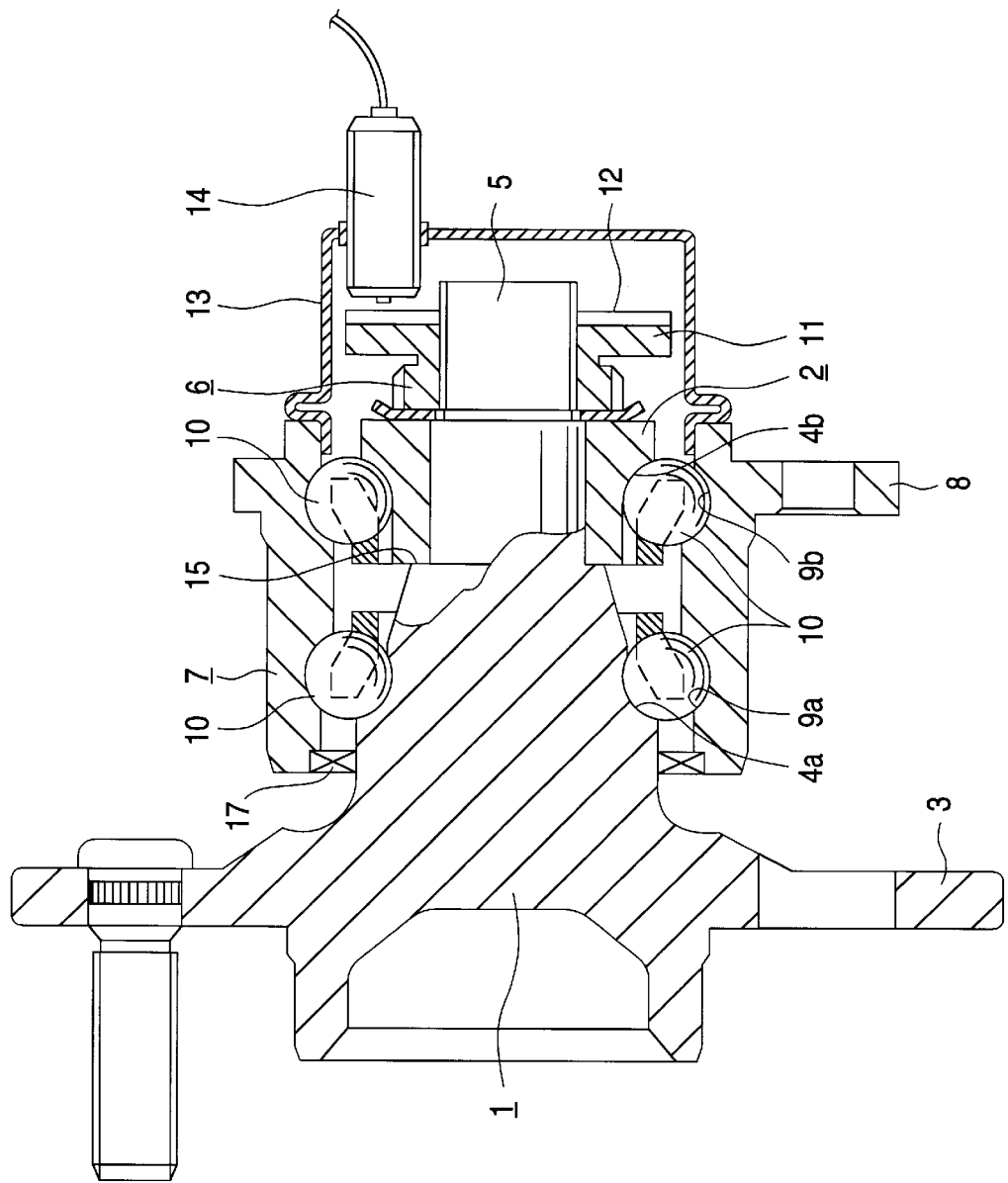
FIG. 21 is a cross-sectional view showing the second conventional example.
Figure 22:
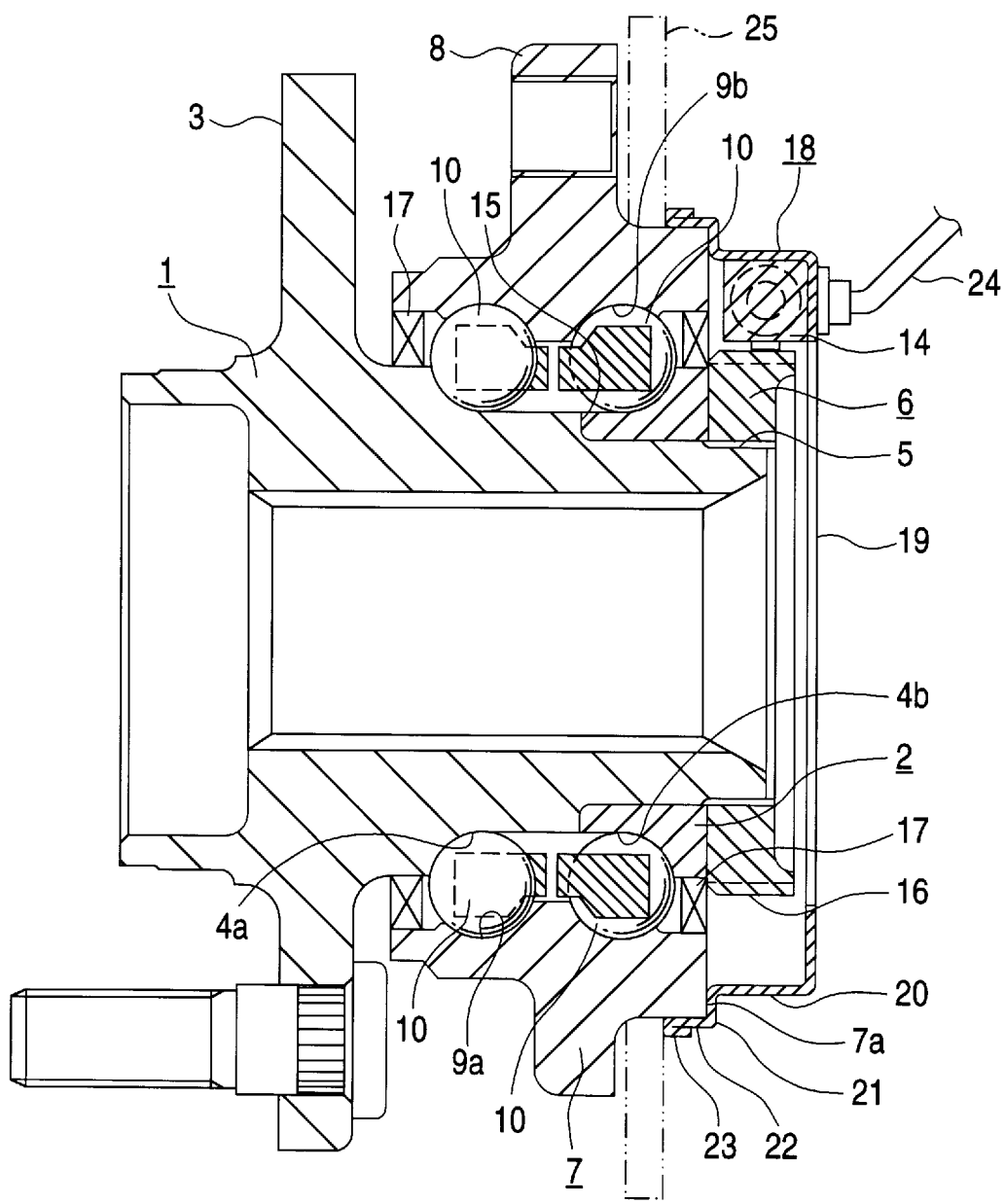
FIG. 22 is a cross-sectional view showing the third conventional example.

FIGS. 13 to 16 are views showing an arrangement of the seventh embodiment of the present invention. The characteristic of the rolling bearing unit having a rotating speed detector according to the seventh embodiment is a structure of the portion where the cover 18b supporting the sensor 20b composing the rotating speed detector in fixed to the inside end opening of the outer race 8. The structure of the rolling bearing unit in the same as that of the second conventional example shown in FIG. 21. Therefore, like reference characters are used to indicate like parts in various views, and the overlapping explanations of the rolling bearing unit are omitted or simplified here. The characteristic portions of the present invention will be explained below.

A cover 18b made of synthetic resin is attached to the inside end opening of the outer race 8 which is a stationary race so as to close the inside end opening of the outer race 8. The cover 18b includes: a disk-shaped closing plate 128 which close the overall inside end opening of the outer race 8; and an engaging cylindrical portion 129 provided in the outer circumferential portion on the outside surface of the closing plate 128. In the seventh embodiment, a sleeve 130 made of a metallic sheet is embedded in the base portion (the right end in FIGS. 13 to 16) of the engaging cylindrical portion 129 and also embedded in the outer circumferential end portion of the closing plate 128. The sleeve 130 is made of a stainless steel sheet or a mild steel sheet coated with an anticorrosion layer of chrome by means of plating. The sleeve 130 is formed into an annular shape, the section of which is an L-shape. The sleeve 130 includes: a cylindrical portion 131; and a flange portion 132 which is outwardly bent at the inside and edge of the cylindrical portion 131 in the diametric direction. A fore end portion of the cylindrical portion 131, that is, a left end portion of the cylindrical portion 131 in FIGS. 13 to 16 is exposed to an outer circumferential surface of the base end portion of the engaging cylindrical portion 129. The flange portion 132 is embedded in the outer circumferential edge portion of the cover 18b which is located outside of the engaging cylindrical portion 129 in the diametric direction. The flange portion 132 is embedded in the middle of the portion with respect to the thickness direction. In this connection, an outer circumferential edge of the flange portion 132 does not reach the outer circumferential edge of the cover 18b, that is, the outer circumferential edge of the flange portion 132 is embedded in the cover 18b.

Figure 13:
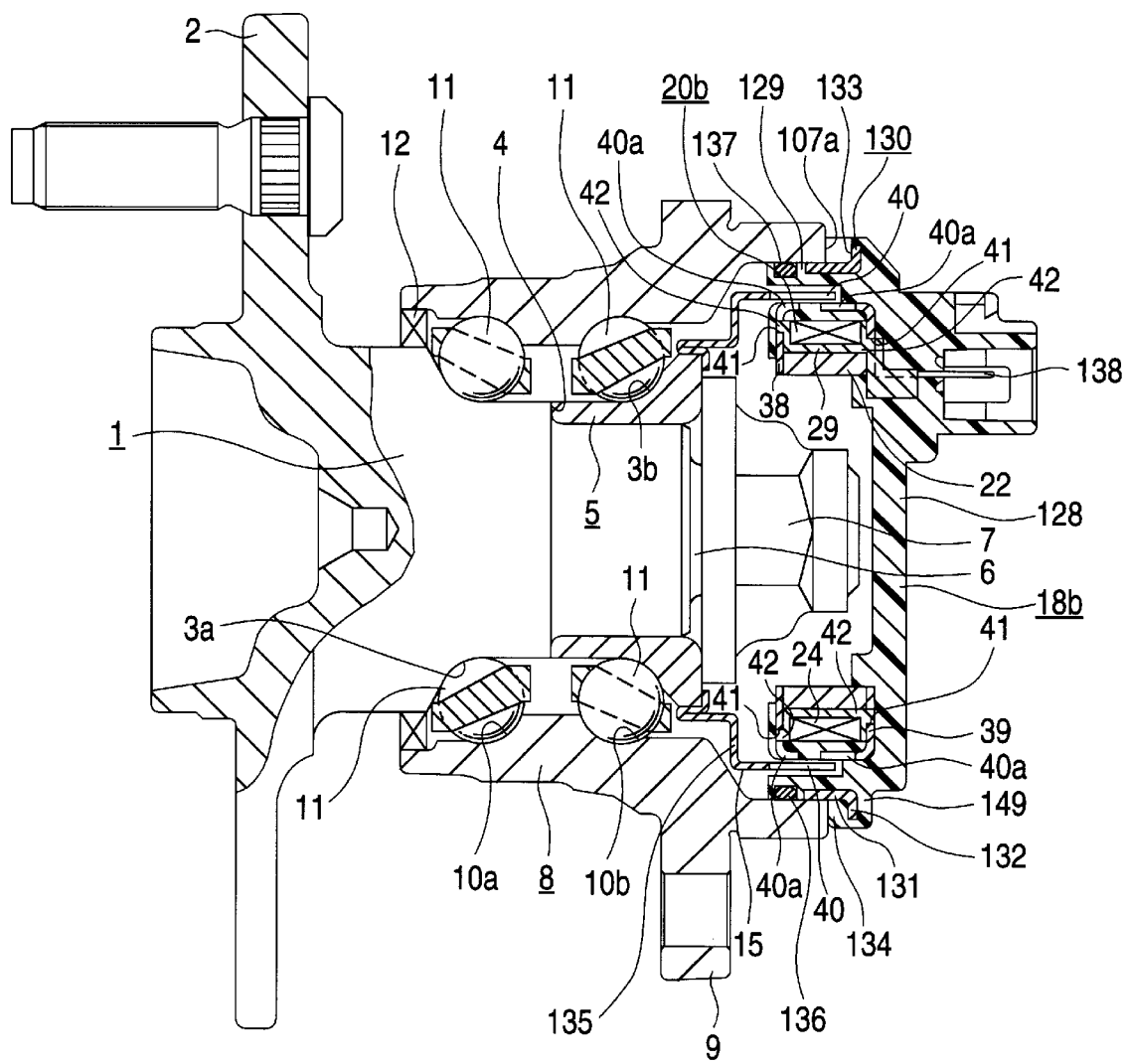
FIG. 13 is a cross-sectional view showing the seventh embodiment of the prevent invention.
Figure 14:
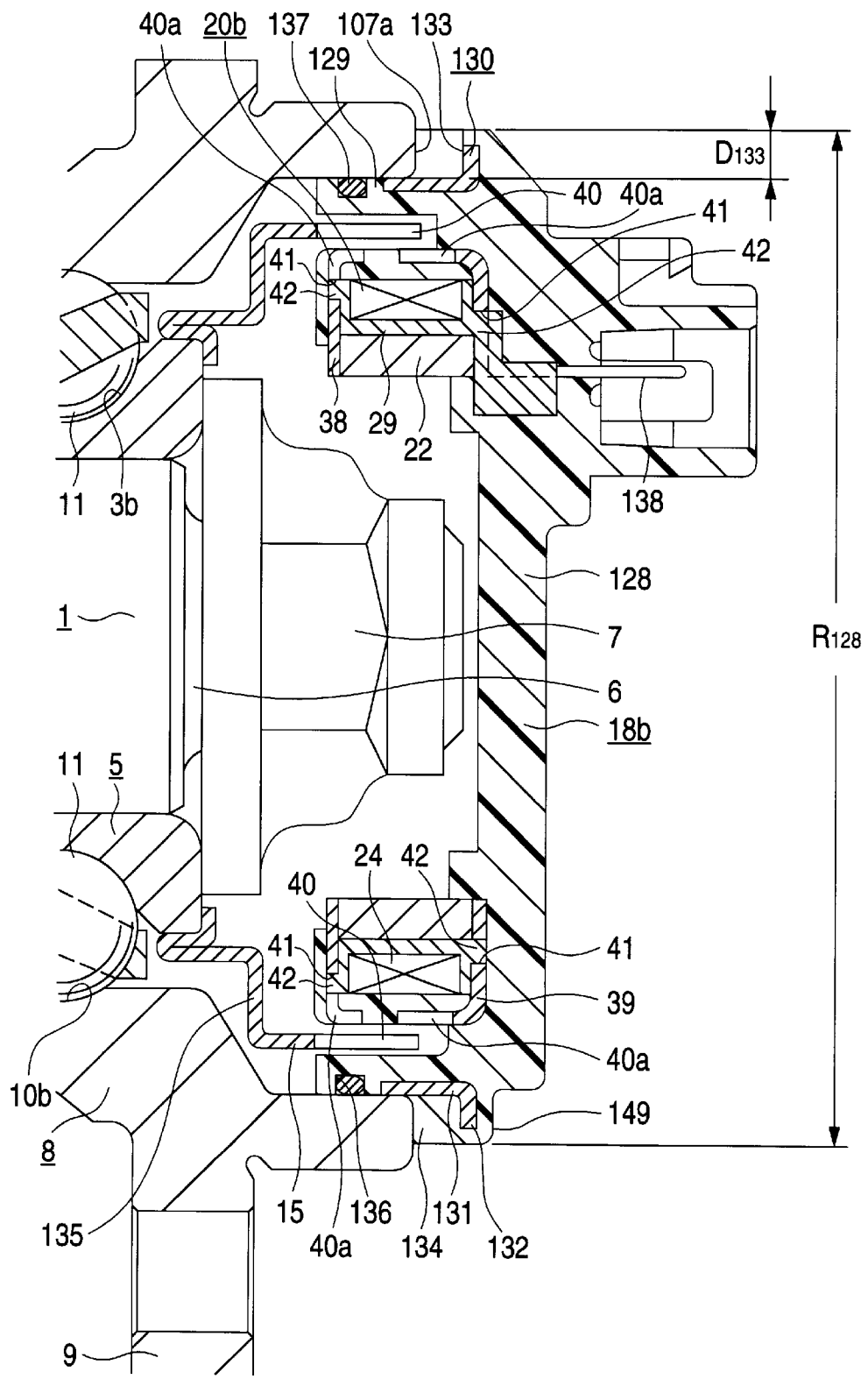
FIG. 14 is an enlarged view of the right end portion of FIG. 13.
Figure 15:
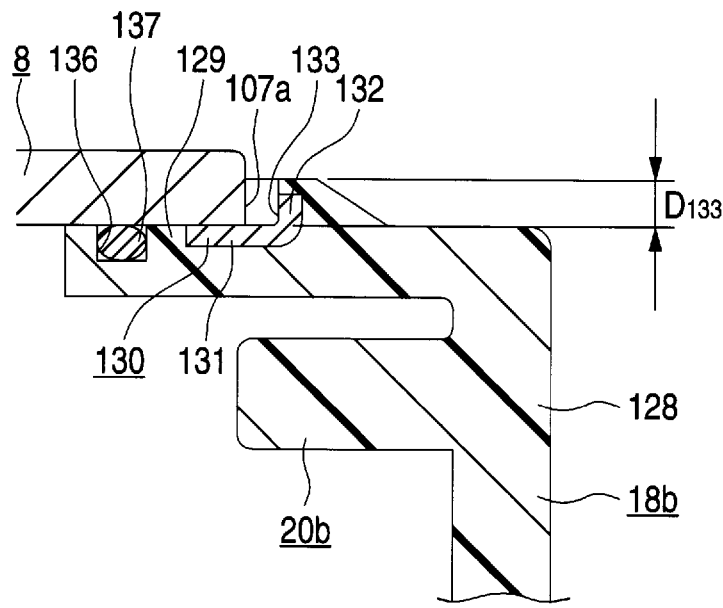
FIG. 15 is an enlarged view of the upper portion of FIG. 14.

A plurality of cutout portions 133 are intermittently formed in the circumferential direction on the outside surface of the outer circumferential edge portion of the cover 18b existing outwardly with respect to the engaging cylindrical portion 129 in the diametric direction. An outer circumferential surface of the cylindrical portion 131 and an outside surface of the flange portion 132, which correspond to cutout portions 133, are not covered with the synthetic resin composing the cover 18b but exposed to cutout portions 133. A confronting portion 134 is formed in an outer circumferential edge portion of the closing plate 128 of the cover 18b which exists outwardly with respect to the engaging cylindrical portion 129 in the diametric direction. The confronting portion 134 is formed on the outside surface of the above outer circumferential edge portion of the closing plate 128. A front end surface of the confronting portion 134, (the left and surface shown in FIGS. 13 to 16) is capable of confronting the inside and surface 107a of the outer race 8. In order to close the inside end opening of the outer race 8, the engaging cylindrical portion 129 is engaged with the inside end portion of the outer race 8 by the cover 18b, and under the condition that each confronting portion 134 confronts the inside end surface 107a of the outer race 8, a positional relation between the sensor 20b described later and the tone wheel 135 outwardly fixed to the inside end portion of the inner race 5 is restricted in a predetermined manner. In thin connection, the tone wheel 135 is formed into an annular shape, the section of which is shown in FIGS. 13 and 14, from a sheet made of magnetic metal such as mild steel.

An engaging groove 136 is formed on an outer circumferential surface of the fore end portion of the engaging cylindrical portion 129, and in a portion on the outer circumferential surface which is not covered with the cylindrical portion 131 of the sleeve 130. The engaging groove 136 in formed all over the circumference of the engaging cylindrical portion 129. An O-ring 137 in fitted in the engaging groove 136. An outer circumferential edge of the O-ring 137 elastically comes into contact with the inner circumferential surface of the end portion of the outer race 8, so that a space formed between the outer circumferential surface of the engaging cylindrical portion 129 and the inner circumferential surface of the outer race 8 can be sealed. An outer diameter of the cylindrical portion 131 in a free condition is a little larger than the inner diameter of the inside end portion of the outer race 8, so that the sleeve 130 can be press-fitted into the inside end portion of the outer race 8. When the O-ring 137 is attached in the engaging groove 136 and before the O-ring is engaged with the inside end portion of the outer race 8, an outer circumferential portion of the O-ring 137 outwardly protrudes from the cylindrical portion 131 in the diametric direction.

A sensor 20b is fitted on an outside surface of the closing plate 128 composing the cover 18b in a portion close to the center in the diametric direction with respect to the engaging cylindrical portion 129. An inside end portion of the sensor 20b is embedded in the closing plate 128. The sensor 20b is entirely formed into an annular shape. An outside half portion of the sensor 20b protrudes from the outside surface of the closing plate 128 composing the cover 18b, and an outer circumferential surface, which functions as a detecting section, is exposed from the synthetic resin composing the cover 18b. A connector 138 for taking out a detection signal from the sensor 20b is formed on an inside surface of the closing plate 128. The connector 138 is formed being integrated with the cover 18b.

According to the rolling bearing unit having a rotating speed detector in the seventh embodiment arranged as described above, when the cover 18b is made of synthetic resin, it is possible to reduce the manufacturing cost. Further, even when the outer diameter of the cover 18b is not particularly extended, the cover 18b can be easily detached from the outer race 8 which is a stationary race. Moreover, the cover 18b and the sensor 20b embedded in the cover 18b can be positively positioned with respect to the outer race 7.

When the cover 18b is detached from the outer race 8, the fore end portion of an appropriate tool is engaged with a plurality of cutout portions 133 formed on the outside surface of the outer circumferential portion of the closing plate 128. Since the cutout portions 133 reach the outer circumferential surface of the cylindrical portion 131 composing the sleeve 130, even if the diameter $R_{128}$ (shown in FIG. 14) of the closing plate 128 is not particularly extended, the depth $D_{133}$ (shown in FIGS. 14 and 15) of each cutout portion 133 is sufficiently extended, so that a sufficiently large space in which the fore end portion of the tool is engaged with each cutout portion 133 can be ensured. When the tool in given a force in a direction so that the cover 18b can be separated from the outer race 8 under the condition that the fore end portion of the tool is sufficiently inserted into the cutout portions 133, the engaging groove 129 of the cover 18b can be pulled out from the outer race 7, and the cover 18b supporting the sensor 20 can be detached from the outer race 8. In this case, a pulling force given to the cover 18b by the fore end portion of the tool is supported by the flange 132 composing the sleeve 130. Accordingly, a portion of the synthetic resin composing the cover 18b is not given a high intensity of stress. Consequently, there is no possibility that the cover 18b is damaged when the cover 18b is detached from the outer race 8.

Under the condition that the cover 18b is engaged with the inside end opening of the outer race 8, when a plurality of confronting portions 134 formed at a position away from the cutout portions 133 in the circumferential direction confront the inside end surface 107a of the outer race 8, the cover 18b and the sensor 20b embedded in the cover 18b can be positioned with respect to the outer race 8. When the engaging cylindrical portion 129 in pushed into the inside end opening of the outer race 8 so as to attach the cover 18b to the inside end opening of the outer race 8, a fore end surface of an appropriate pushing shaft is made to confront a pushing surface 149 formed in an outer circumferential portion on the inside surface of the closing plate 128 which corresponds to each confronting portion 134.

In the rolling bearing unit having a rotating speed detector according to the seventh embodiment of the present invention, the confronting portions 134 used for positioning the cover 18b and the cutout portions 133 used for engaging the fore end portion of the tool are alternately intermittently formed in the circumferential direction. Since the confronting portions 134 and the cutout portions 133 are alternately intermittently formed in the circumferential direction, it is possible to extend the size of a clearance in the radial direction necessary for inserting the fore end portion of the tool can be extended without extending the outer diameter of the cover 18b. In this case, the size of a clearance in the radial direction necessary for inserting the fore end portion of the tool in the same an the depth $D_{133}$ of the cutout portion 133. As a result, while the interference of the cover 18b with other members is prevented, the cover 18b can be detached from the outer race 8 without causing a damage in the cover 18b.

Figure 16:
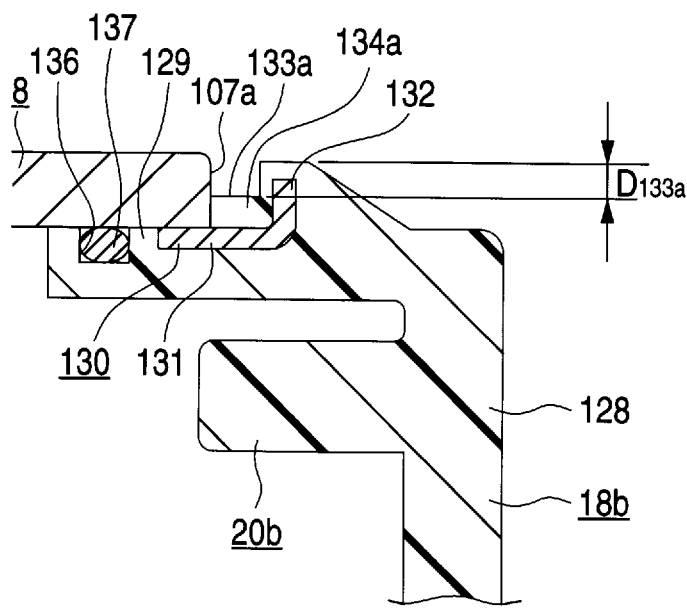
FIG. 16 is a view showing an unpreferable example in the same manner as FIG. 15.

On the other hand, in the arrangement shown in FIG. 16, the cutout portions 133a to be engaged with the fore end portion of the tool are provided all over the circumference of the cover 18b, and on the inner diameter side of the cutout portions 133a, the confronting portions 134a to confront the inside end surface 107a of the outer race 8 are also provided all over the circumference of the cover 18b. According to this arrangement shown in FIG. 16, it impossible to provide the same effect as that of the present invention explained before. The reason is described as follows. When the depth $D_{133a}$ of the cutout portion 133a is extended in the arrangement shown in FIG. 16 so as to ensure a space in which the fore end portion of the tool it engaged, the outer diameter of the cover 18b is extended. Therefore, the cover 18b tends to interfere with other members. Due to the foregoing, the degree of freedom is deteriorated in the design of an automobile. Accordingly, the arrangement shown in FIG. 16 is unpreferable as described before.

Figure 17:
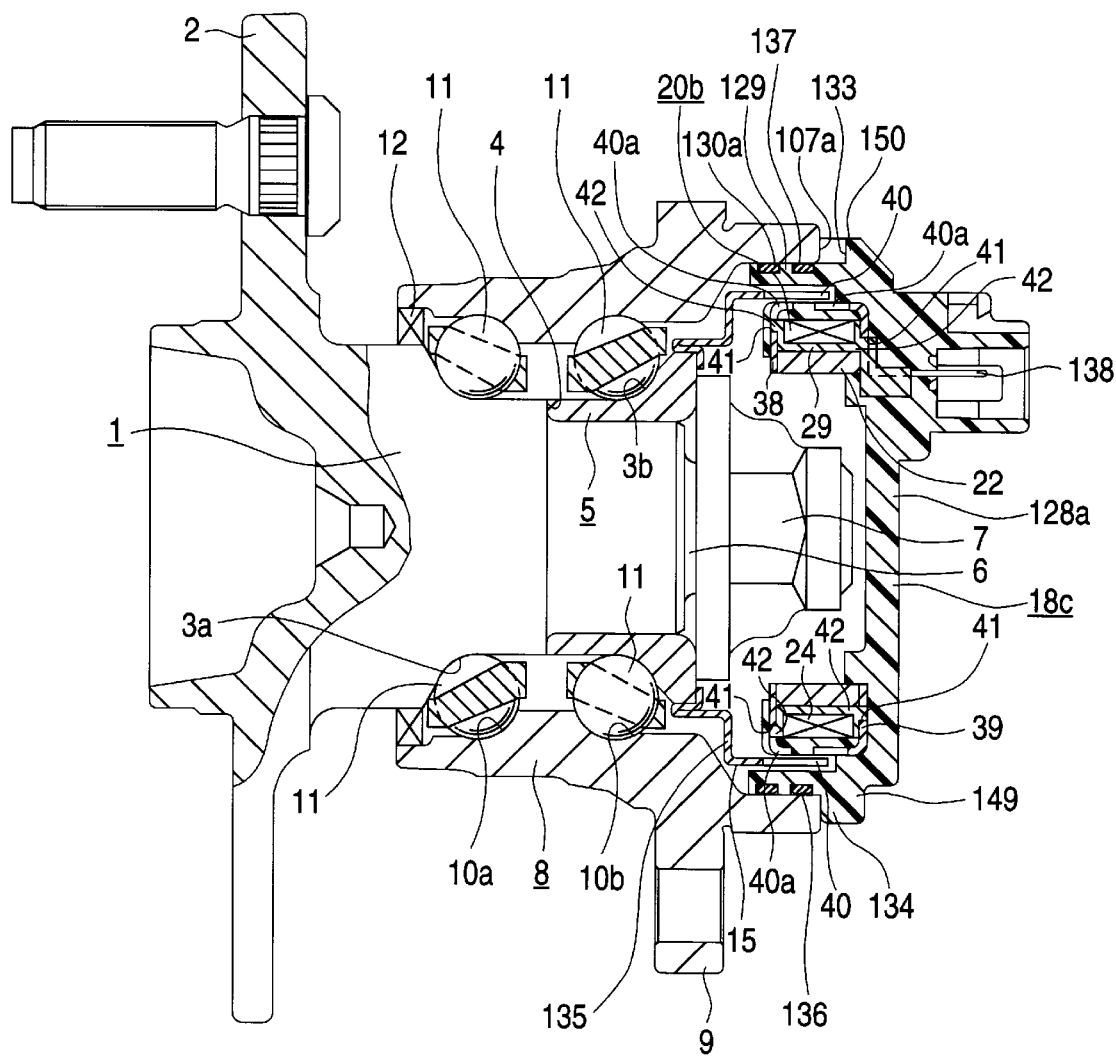
FIG. 17 is a cross-sectional view showing the eighth embodiment of the present invention.
Figure 18:
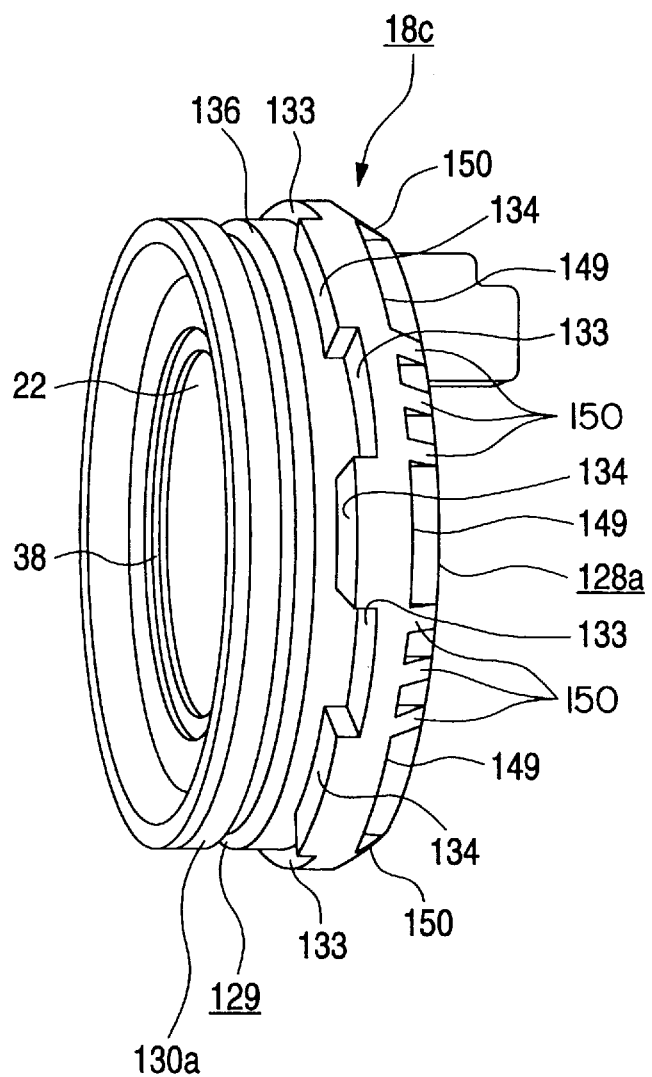
FIG. 18 is a perspective view of the cover used in the eighth embodiment.

FIGS. 17 and 18 are views showing an arrangement of the eighth embodiment of the present invention. Like reference characters are used to indicated like parts in various views, therefore, overlapping explanations of the roller bearing unit are omitted. In the eighth embodiment, the sleeve 130a for ensuring the engaging strength of the cover 18c with the outer race 8 is formed into a simple cylindrical shape. The sleeve 130a is embedded in and supported by a fore end portion of the engaging cylindrical portion 129 formed on the cover 18c. An O-ring 137 is fitted between an outer circumferential surface of the engaging cylindrical portion 129 and an inner circumferential surface of the inside end of the outer race 8. The O-ring 137 is located at a position which is closer to the inside end opening of the outer race 8 than the sleeve 130a. Accordingly, when the engaging cylindrical portion 129 In inwardly engaged with the inside and portion of the outer race 8, there is no possibility that rain water intrudes into the sleeve 130a. Consequently, it is not necessary to use a member made of expensive material such as a stainless steel sheet or a steel sheet coated with an anticorrosion layer, for the above sleeve 130a. Even if such a member made of expensive material in not used, there in no possibility that both the sleeve 130a and the outer race 8 are corroded. Therefore, the manufacturing cost can be reduced by reducing the material cost.

In the eighth embodiment of the present invention, the sleeve 130a is formed into a simple cylindrical shape, and the sleeve 130a is embedded in and supported by the fore end portion of the engaging cylindrical portion 129. Due to the foregoing, when the engaging cylindrical portion 129 in pulled out from the outer race 8 so as to separate the cover 18c from the outer race 8, a relatively high intensity of stress is given to a portion of the synthetic resin composing the cover 18c close to the outer circumferential portion of the closing plate 128a. According to the eighth embodiment, reinforcing ribs 150, 150 are formed on the inside surface of the closing plate 128a and on the opposite side to the cutout portions 133, 133 which are to be engaged with the fore and portion of the tool. When the reinforcing ribs 150, 150 are formed in this way, a stress given to the rigid resin composing the outer circumferential portion of the closing plate 128a in the process of pulling can be sufficiently received. Further, according to the eighth embodiment, when the engaging cylindrical portion 129 is pulled out from the inside of the outer race 8, there in a possibility that the engaging cylindrical portion 129 is not damaged at its end portion by the frictional force between the outer circumference of the sleeve 130a and the inner circumference of the outer race 8. The end portion of the engaging cylindrical portion 129 is secured to have the strength enough to avoid the possibility in accordance with the frictional force. Other arrangements and functions are the same as those of the seventh embodiment described before. Therefore, like reference characters are used to indicate like parts in various views, and the overlapping explanations of the rolling beating unit are omitted or simplified here.

Since the rolling bearing unit of the present invention is arranged and functions as described above, the number of parts can be reduced and the manufacturing cost can be reduced. Further, it is possible to provide a rotating speed detector of high durability and reliability.

Manufacturing work of the rolling bearing unit of the present invention can be simplified and the manufacturing cost can be reduced. Further, it is not necessary to use a specific apparatus for the inspection and maintenance of the rolling bearing unit of the present invention. Without using a specific apparatus, the rolling bearing unit can be overhauled and assembled without damaging the components. Accordingly, it is possible to provide a rolling bearing unit having a rotating speed detector, the maintenance cost of which is low.

Since the rolling bearing unit having a rotating speed detector according to the present invention is arranged and functions as described above, it can be made compact and the interference of the rolling bearing unit with other members seldom occurs. Therefore, the degree of freedom can be ensured in the design of an automobile. Accordingly, the manufacturing cost can be reduced by suppressing a quantity of material to be used, and further the weight of the rolling bearing unit can be decreased.

What is claimed is:

1. A rolling bearing unit having a rotating speed detector, comprising:

an outer race being fixed and including an outer raceway on an inner circumferential surface of the outer race;

an inner race being rotatable and including an inner raceway on an outer circumferential surface of the inner race;

a plurality of rolling elements arranged to be freely rolled between the outer raceway and the inner raceway;

a cover made of synthetic resin and fixed to an opening end of the outer race;

a detector including a detected element fixed to the inner race and a sensor embedded in the cover for detecting a rotating speed in cooperation with the detected elements;

a sleeve made cylindrically of metal and fixed onto the cover, wherein a first leaking passage exists between a first clearance defined between engaging surfaces of the sleeve and the outer race and a third clearance defined between engaging surfaces of the outer race and the cover, the first and the third clearances being arranged in series to each other, and a second leaking passage exists between the third clearance and a second clearance formed in a contact portion of the sleeve with the cover, the third and the second clearances being arranged in series to each other; and a seal ring fitted between the cover and the outer race at a position located in series to the first and the second leaking passages.

2. The rolling bearing unit of claim 1, wherein the cover comprises a main body made of synthetic resin in which the sensor is embedded, the main body covering the opening end of the outer race, wherein the sleeve is formed from a metallic sheet into an annular shape having an L-shaped section, the sleeve being embedded in an outer circumference of the main body, and including a cylindrical portion having an outer diameter enough to be freely fixed to the opening end of the outer race and a flange portion bent at an and edge of the cylindrical portion in a diametric direction of the cylindrical portion, the flange portion and a portion of the cylindrical portion close to the flange portion being embedded in the outer circumference of the main body, wherein a fore end of the cylindrical portion is inwardly engaged with the opening end of the outer race, the main body having a side which is confronted with an end surface of the outer race in which a groove is formed between the side of the main body and the and surface of the outer race, and wherein the seal ring is made of elastic material and attached to a confronting portion of the side of the main body with the end surface of the outer race to tightly seal the confronting portion.

3. The rolling bearing unit of claim 1, wherein the cover comprises a main body made of synthetic resin in which the sensor is embedded, the main body including a sheet portion having a dimension enough to cover the opening end of the outer race and a cylindrical portion formed on the sheet portion, the cylindrical portion being freely confronted with an end surface of the outer race, wherein the sleeve includes a small diameter portion, a large diameter portion, and a step portion connecting the small and the large diameter portions to form the sleeve into an annular crank-shape, the small diameter portion being embedded in the cylindrical portion, the large diameter portion being outwardly engaged with the opening end of the outer race, and wherein the seal ring is fitted inside an annular groove which is formed to be surrounded by the large diameter portion, the cylindrical portion, and the step portion, the seal ring being elastically interposed between the opening end of the outer race and the step portion to tightly seal a confronting portion of the opening end of the outer race with the cylindrical portion.

4. The rolling bearing unit of claim 1, wherein the cover includes an engaging cylindrical portion which is engaged with the opening end of the outer race, a flange portion protruding in the diametric direction from a circumferential surface of the engaging cylindrical portion, a plurality of confronting portions confronting an end surface of the outer race in an axial direction of the outer race to position the cover with respect to the outer race, and a plurality of cutout portions to fore a clearance between the end surface of the outer race and the engaging cylindrical portion, each of the confronting portions and the cutout portions being alternately formed in a circumferential direction of the cover.

* * * * *